Feb. 11, 1930.　　　J. H. MEYERS ET AL　　　1,746,549
PRINTING DEVICE
Filed Dec. 20, 1926　　　10 Sheets-Sheet 1
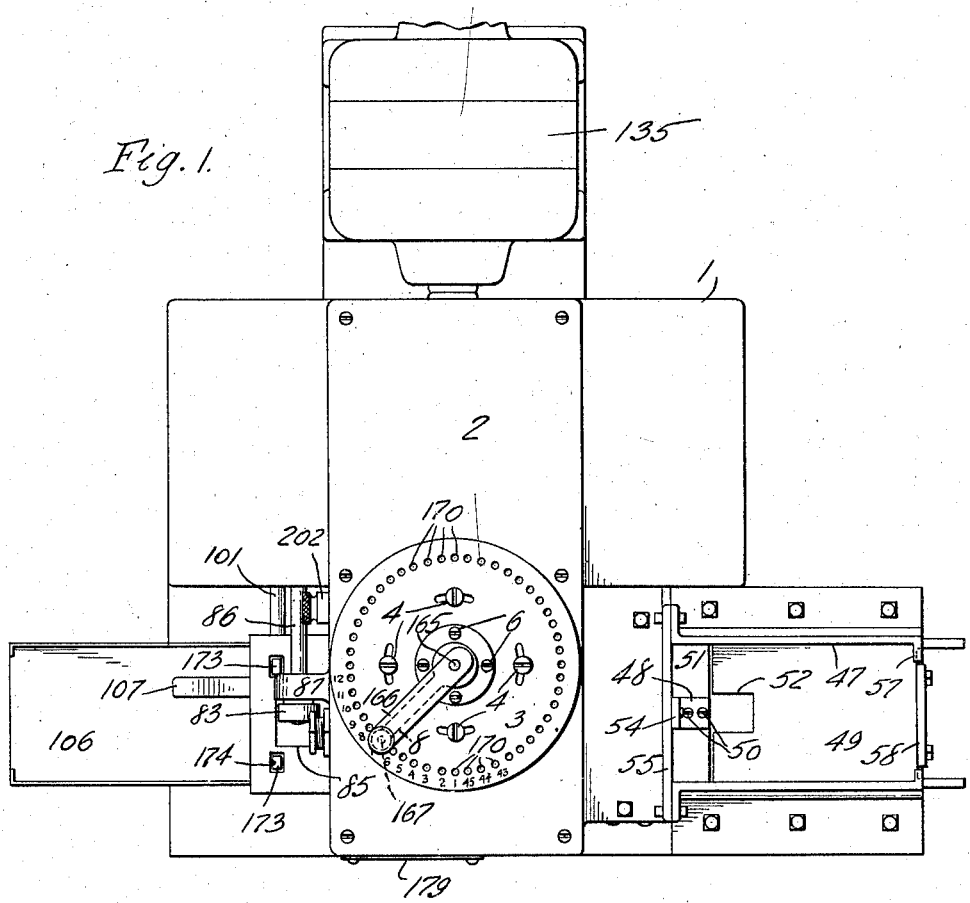
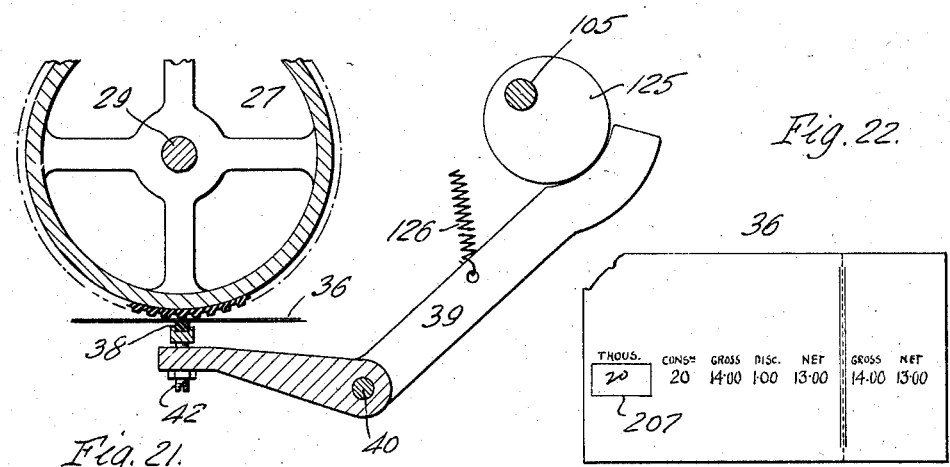
INVENTORS.
Joseph H. Meyers
and Elmer Rosenberg.
by Parker Brockwell
ATTORNEYS

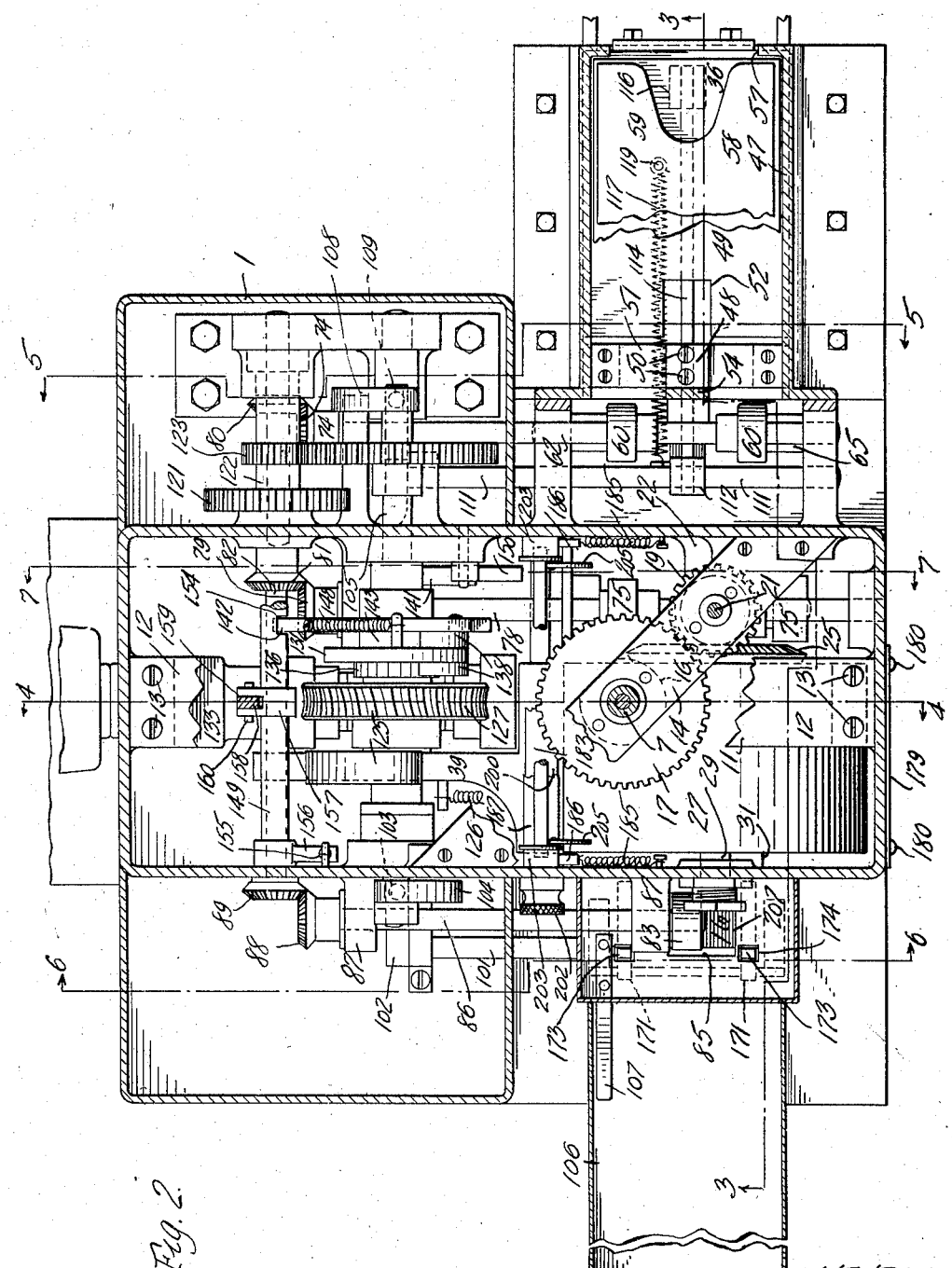

Feb. 11, 1930.     J. H. MEYERS ET AL     1,746,549
PRINTING DEVICE
Filed Dec. 20, 1926      10 Sheets-Sheet 5

INVENTORS.
Joseph H. Meyers
and Elmer Rosenberg
by Parker & Brackson
ATTORNEYS.

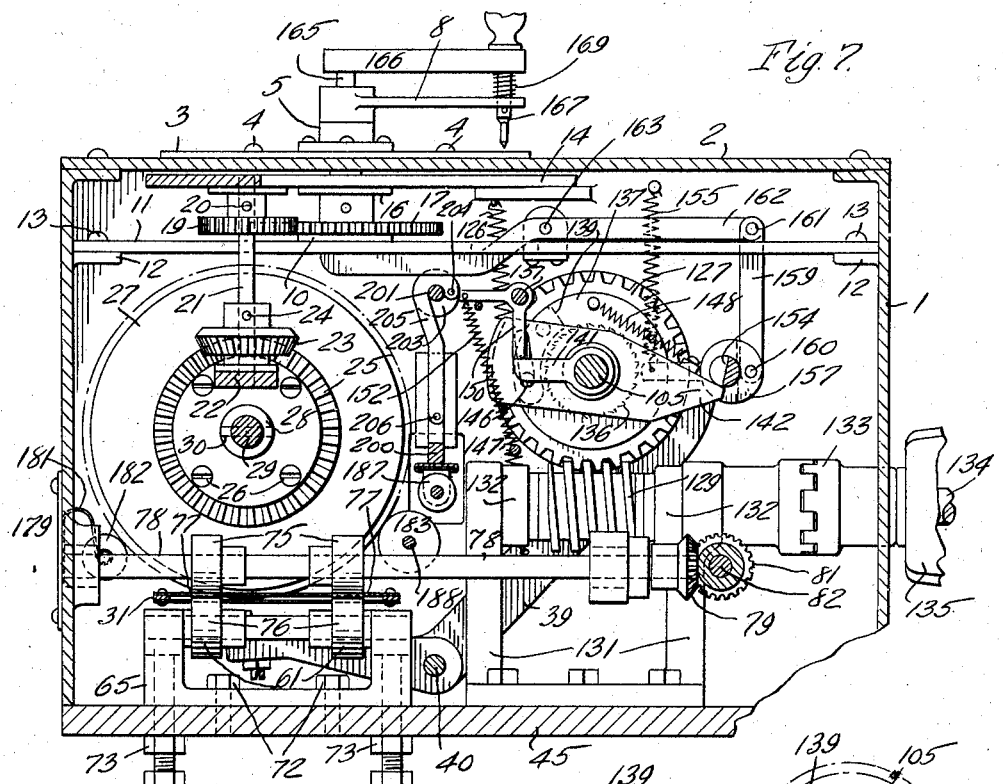

Feb. 11, 1930. J. H. MEYERS ET AL 1,746,549
PRINTING DEVICE
Filed Dec. 20, 1926 10 Sheets-Sheet 7
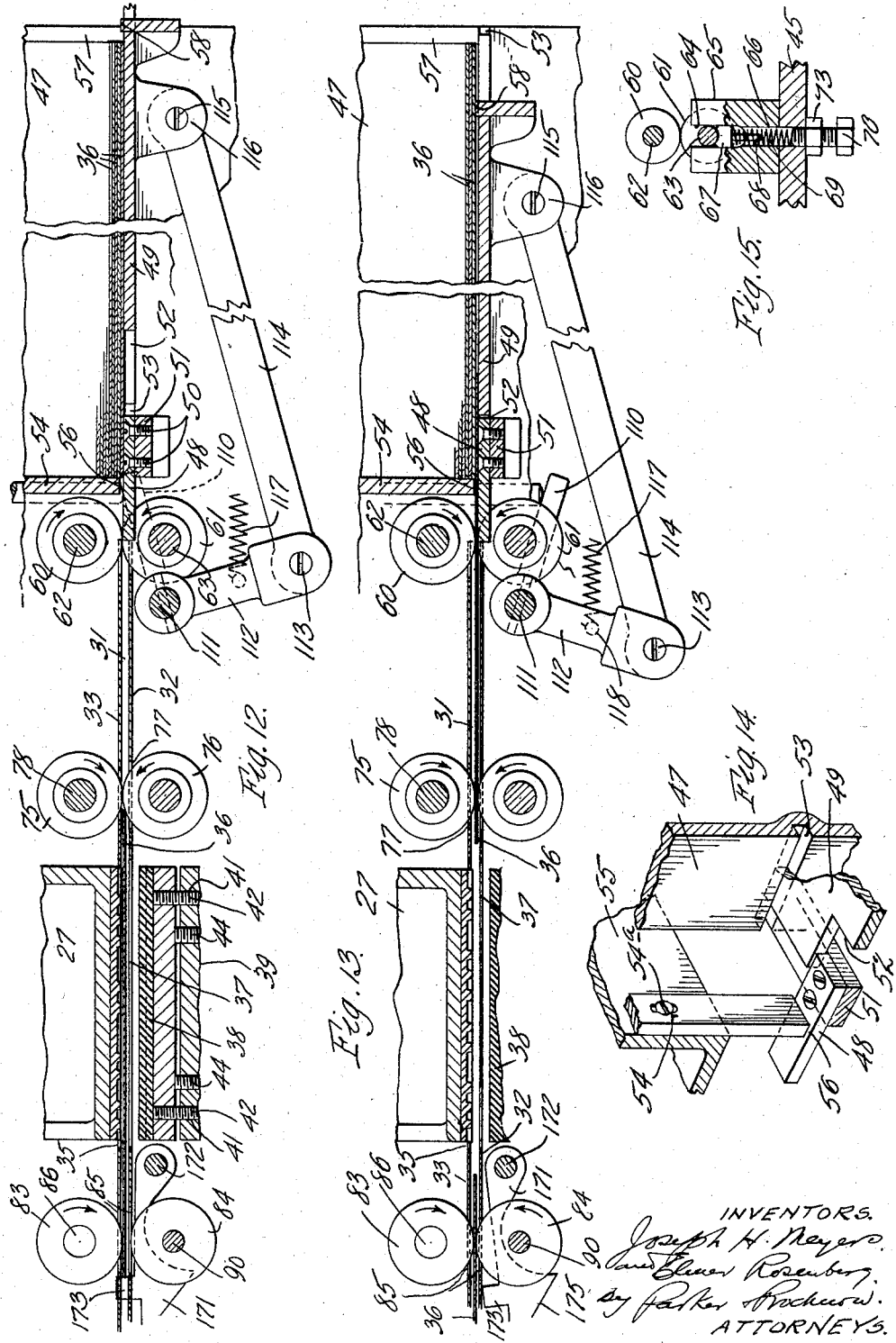

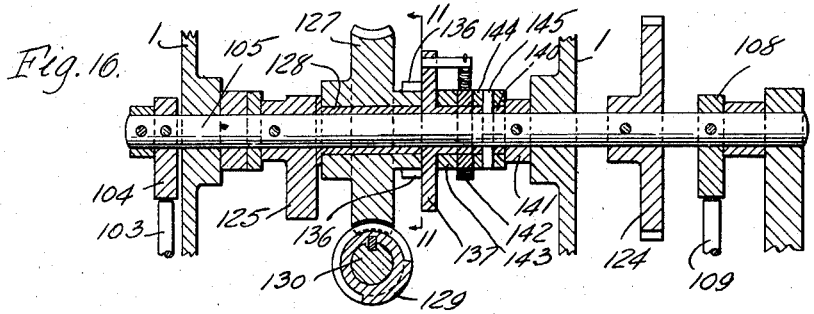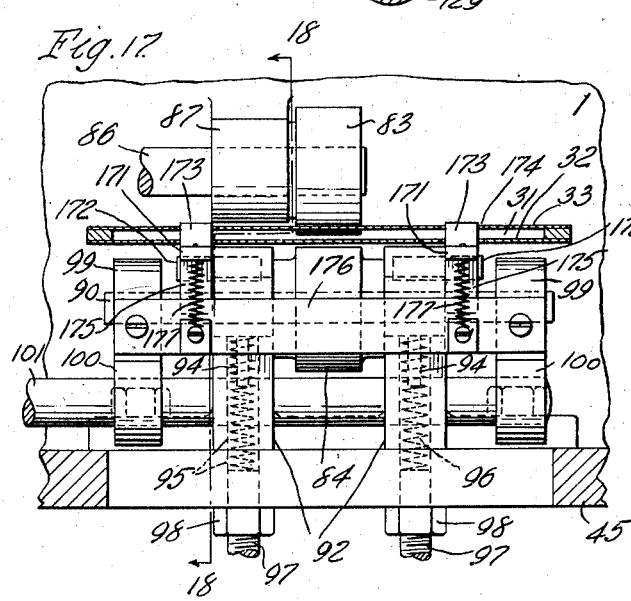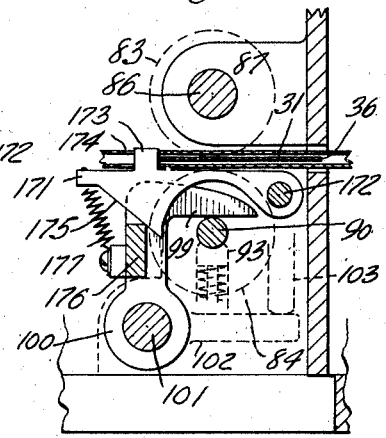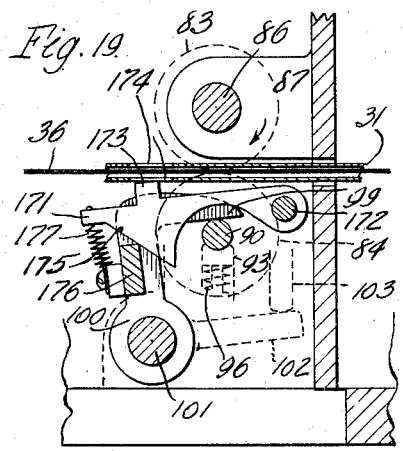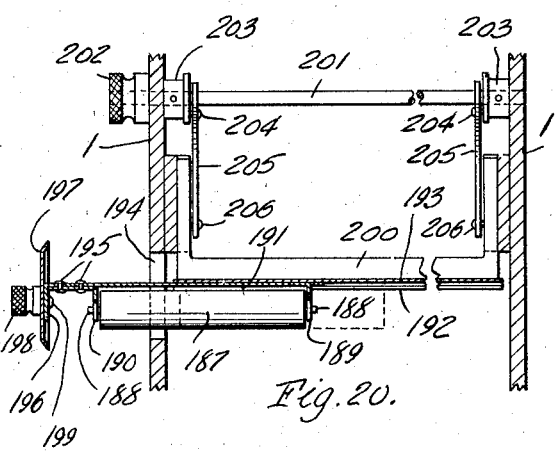

Feb. 11, 1930.   J. H. MEYERS ET AL   1,746,549
PRINTING DEVICE
Filed Dec. 20, 1926    10 Sheets-Sheet 9
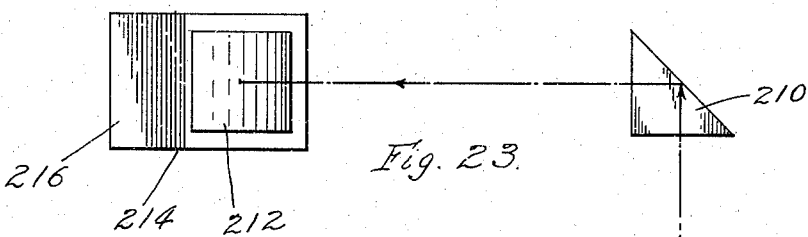
Fig. 23.
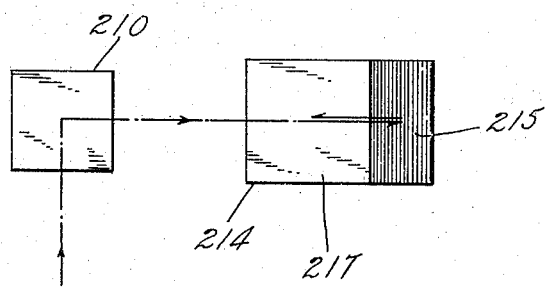
Fig. 24.
INVENTORS.
Joseph H. Meyers
and Elmer Rosenberg,
By Parker & Prochnow.
ATTORNEYS Feb. 11, 1930.  J. H. MEYERS ET AL  1,746,549
PRINTING DEVICE
Filed Dec. 20, 1926   10 Sheets-Sheet 10

INVENTORS.
Joseph H. Meyers
Paul Elmer Rosenberg.
By Parker & Prochnow.
ATTORNEYS.

Patented Feb. 11, 1930

1,746,549

UNITED STATES PATENT OFFICE

JOSEPH H. MEYERS AND ELMER ROSENBERG, OF BUFFALO, NEW YORK

PRINTING DEVICE

Application filed December 20, 1926. Serial No. 157,793.

This invention relates to printing devices, and more particularly to such devices which may be advantageously employed for the printing of amounts due on bills of customers of public service corporations, such as gas and electric companies, or for filling in amounts payable on checks, or for computing and listing items. For example, in making out the bills of customers, such as with gas and electric companies, considerable clerical labor has heretofore been necessary in entering on the bills largely in duplicate, the amount of electricity or gas consumed during the period covered by the bill, computing the amount to be paid for the gas or electricity consumed, often taking into account rates that vary with the amount of current or gas used, listing the cash discounts allowed if the bill is paid within a given period, and filling in the net amount to be paid in the event that the bill is paid within a certain period.

An object of this invention is to provide an improved printing device for facilitating the computation and entry of such or similar information; with which the entry and printing of computations or information may be accomplished in a more rapid and inexpensive manner; with which the liability of human errors will be greatly reduced; with which human errors in making the entries may be easily and quickly detected; and which will be relatively simple, compact, easily manipulated, rapid in operation and inexpensive.

Various other objects and advantages will be apparent from the following description of an embodiment of the invention, and the novel features will be particularly pointed out hereinafter in connection with the appended claims.

In the accompanying drawing:

Fig. 1 is a plan of a printing device constructed in accordance with the invention;

Fig. 2 is a sectional plan of the same;

Fig. 7 is another sectional elevation of the same, with the section taken approximately along the line 7—7 of Fig. 2;

Fig. 8 is a sectional elevation of a part of the device, somewhat similar to a part of Fig. 7, but illustrating parts of the escapement mechanism in a different operative condition from that shown in Fig. 7;

Fig. 9 is a sectional elevation of a part of the mechanism shown in Fig. 8 and illustrating still another operative condition which parts of the escapement may assume;

Fig. 10 is a sectional elevation of parts of the clutch mechanism;

Fig. 11 is a sectional elevation through a part of the clutch mechanism, the section being taken approximately along line 11—11 of Fig. 16;

Fig. 12 is a sectional elevation of part of the mechanism utilized for feeding the blanks to be printed upon through printing position;

Fig. 13 is a similar view, but illustrating the parts in a different operative relation, with one of the blanks in the process of being transferred into printing position;

Fig. 14 is a fragmentary perspective of a part of the means for supporting the blanks and feeding them singly toward printing position;

Fig. 15 is a fragmentary, sectional elevation of a mechanism for pressing the feed rollers toward one another and illustrating how the pressure between the feed rollers may be varied;

Fig. 16 is a sectional elevation through the clutch mechanism and adjacent parts;

Fig. 17 is a sectional elevation through part of the mechanism for removing the printed blanks from printing position;

Fig. 18 is a sectional elevation of the parts shown in Fig. 17, with the section taken approximately along the line 18—18 of Fig. 17, and the parts shown in one operative condition;

Fig. 19 is a transverse, sectional elevation of the parts shown in Fig. 17, but with the parts shown in a different operative condition from that shown in Fig. 18;

Fig. 20 is a sectional elevation through a portion of the device and illustrating the manner of removing an ink supply roller for recharging with ink;

Fig. 21 is a sectional elevation of the printing mechanism;

Fig. 22 is a plan of a blank or card bearing selected information such as that which may be printed in accordance with this invention;

Fig. 23 is a side elevation of a diagram illustrating an optical system which may be employed for magnifying the guide or reference numerals on the cards or blanks being printed upon, and for projecting images of the same to a point conveniently visible;

Fig. 24 is a front elevation of the same;

Figure 3:
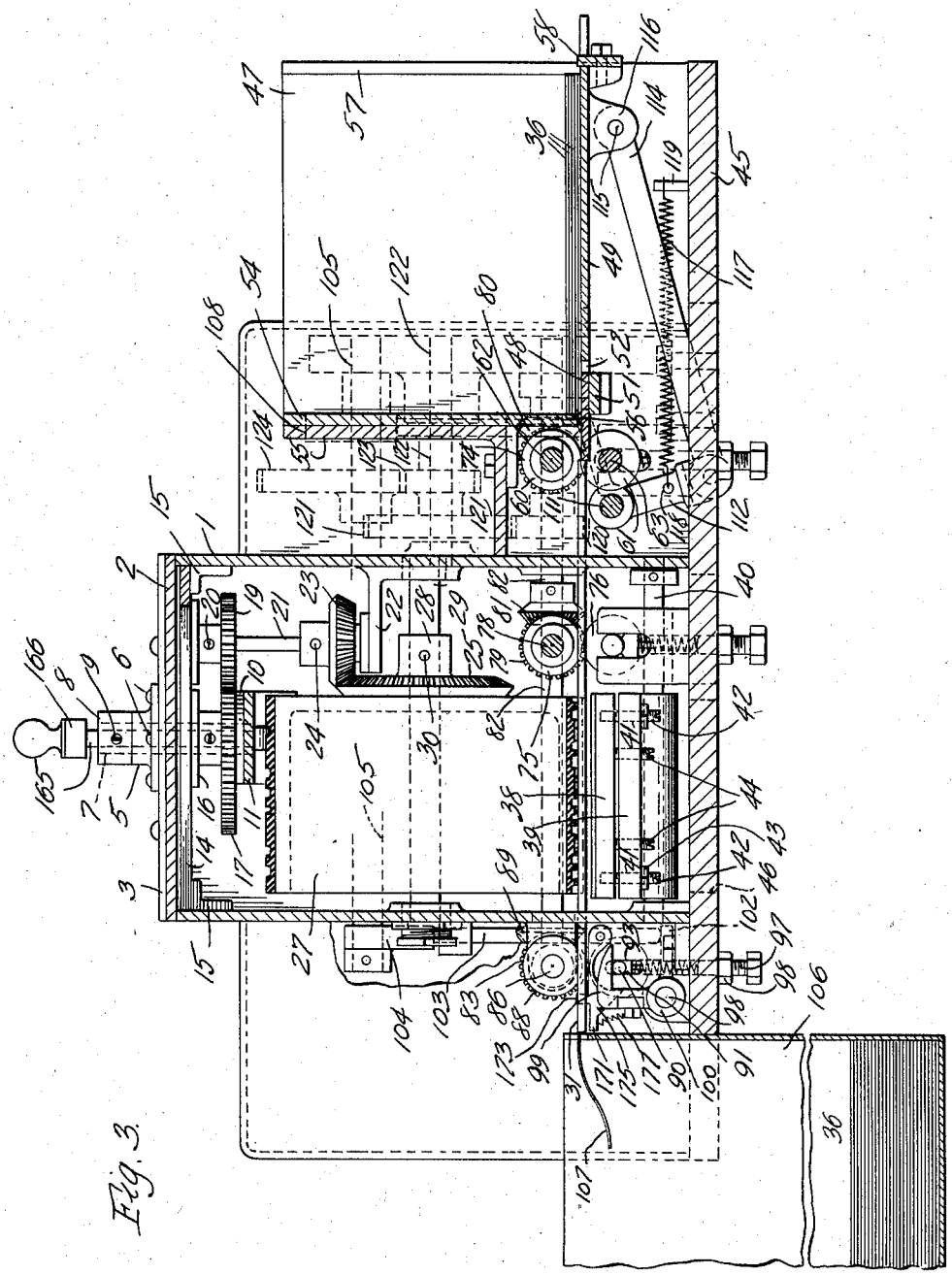
Fig. 3 is a sectional elevation of the same, with the section taken approximately along the line 3—3 of Fig. 2.

In the illustrated embodiment of the invention, the mechanism may be enclosed in a suitable casing 1 having a top plate 2 (Fig. 4) which carries a dial plate or disk 3 that may be secured upon the outer face of the plate 2 in any suitable manner, such as by screws 4. A bearing hub 5 may be secured to the dial plate or disk 3 in any suitable manner, such as by screws 6. This bearing hub rotatably supports a sleeve 7 in an upright position. An arm 8 is fitted over the outer end of the sleeve 7 and secured thereon in any suitable manner, such as by a set screw 9, the arm abutting against an end face of the bearing hub so as to prevent inward movement of the sleeve. The inner end of the sleeve 7, that is, the end which extends through the top plate 2 and into the casing 1, is rotatably mounted in a bearing bushing 10 which is removably mounted in a bar 11 extending across the interior of the casing section which is closed by the plate 2, the bar 11 resting at its ends upon lugs 12 provided upon the inner faces of the side walls of the casing or enclosure 1, and being also secured against displacement thereon in any suitable manner, such as by screws 13.

Between the top plate 2 and the bar 11, a second bar 14 extends diagonally across the interior of the casing, being mounted at its ends upon lugs 15 provided on the lateral walls of the casing. A bearing bushing 16 is removably secured to the bar 14 intermediate of its ends, and this bushing receives and rotatably supports the sleeve 7. A gear 17 is secured in any suitable manner, such as by set screws 18, to the sleeve 7 between the bearing bushings 10 and 16, and meshes with and drives a pinion 19 (see Figs. 2, 3 and 7), which is secured in any suitable manner, such as by a set screw 20 to the stub shaft 21. The shaft 21 is rotatably supported at one end in the bearing bar 14, and at its other end in a bracket arm 22, extending from the side wall of the casing of the enclosure 1 (see Fig. 3, particularly).

A bevel pinion 23 is secured in a suitable manner, such as by set screws 24 to the stub shaft 21, so as to be driven thereby, the pinion 23 abutting at one face against the bearing bracket arm 22 to prevent downward movement of the stub shaft 21, and the pinion 19 bearing at one of its faces against the under face of the bar 14, so as to limit upward movement of the shaft 21. The bevel pinion 23 meshes with and drives the bevel gear 25 (see Figs. 2, 3 and 7 particularly), which is secured in any suitable manner, such as screws 26, to one end face of a printing drum or cylinder 27. The bevel gear 25 is provided with an axially extending boss 28 (see Figs. 3 and 7) which receives a drum shaft 29, rotatably supported at its ends in suitable bearing bosses provided in opposite lateral walls of the enclosure or casing 1. The boss 28 of the gear 25 is secured to the shaft 29 in any suitable manner, such as by a pin 30 which extends transversely through the boss and shaft to lock the two together. The printing drum or cylinder is thus mounted upon the gear 25 and the latter is fixed to the shaft 29, so that the latter acts as the support and axis of the printing cylinder.

Figure 4:
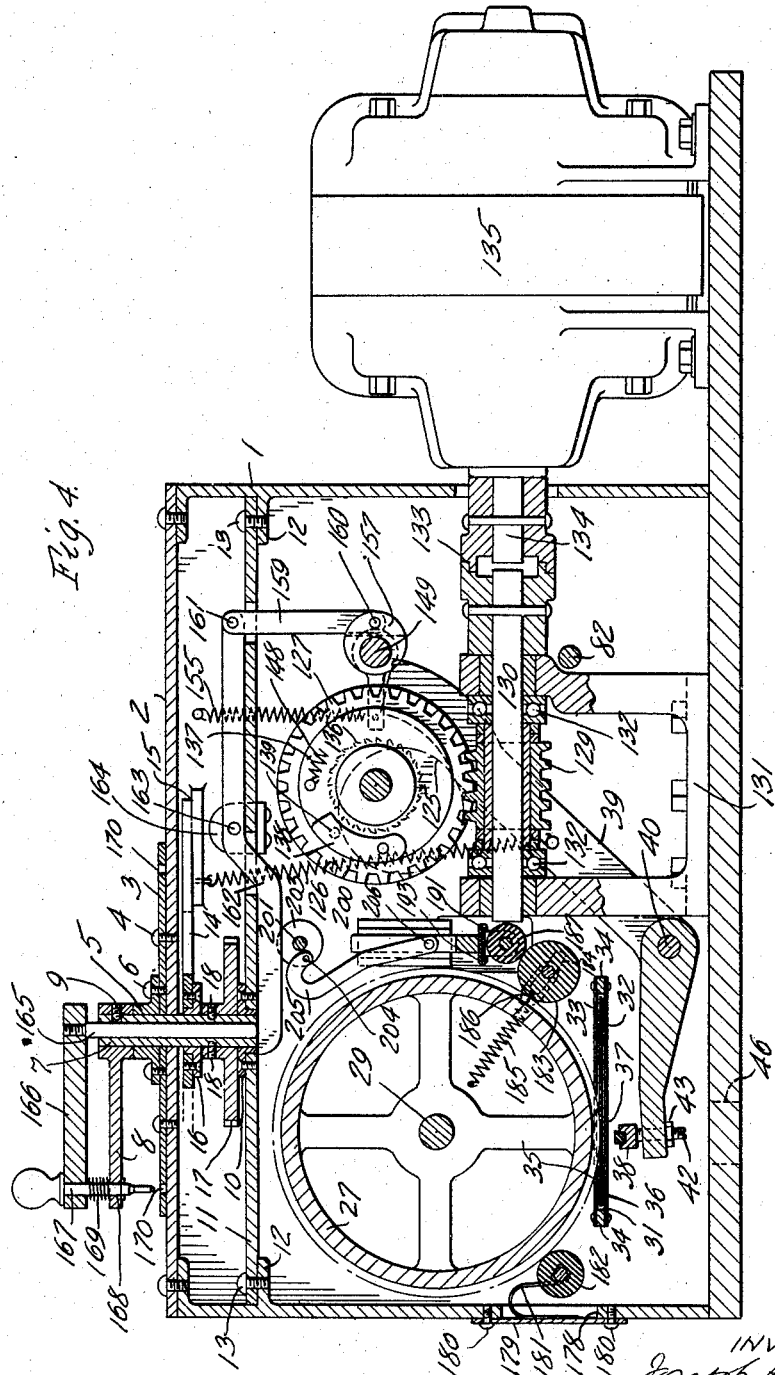
Fig. 4 is another sectional elevation of the device, with the section taken approximately along the line 4—4 of Fig. 2.
Figure 5:
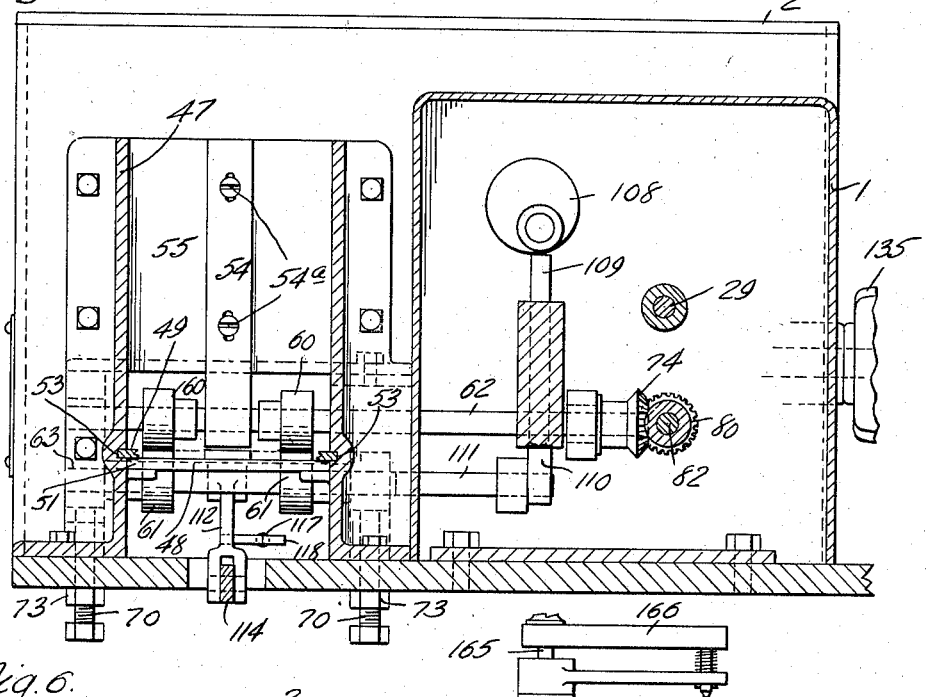
Fig. 5 is another sectional elevation of the same, with the section taken approximately along the line 5—5 of Fig. 2.

From the foregoing it will be observed that by rotating the arm 8 in either direction, the printing cylinder or drum may be rotated in either direction. The peripheral surface of the drum or cylinder 27 is provided with suitable type characters, which may be brought by suitable rotation of the drum into printing position within a channel guide 31 through which blanks to be printed upon are conducted and in which they are supported in printing position (see Fig. 4 particularly). This channel guide may be constructed in any suitable manner, such as by plates 32 and 33 (Fig. 4) which are separated by spacer bars 34 that extend through the casing. The upper plate 33 is provided with an aperture 35 through which a small peripheral arc of the printing drum or cylinder may extend, as shown in Fig. 4, so as to bring the printing characters into printing relation to a blank or card 36 supported within the guide or channel 31.

The lower plate 32 may also have an aperture 37 aligned with the aperture 35, so as to permit movement therethrough and against the blank, of a platen 38 disposed at the opposite face of the guide or channel from the drum. The relative movement of the platen 38 and drum 27 compresses the blank or card 36 between them and causes an imprint upon the card of the particular type characters which are carried by the drum in printing position. The platen 38 (Fig. 3) is mounted in any suitable manner upon one end of a lever 39, which in turn is mounted for rocking movement upon a shaft 40 which extends between and is carried by opposite lateral walls of the enclosure or casing 1.

In order to insure complete contact of the platen with the type bearing surface of the printing cylinder or drum, it is desirable to provide for some adjustment of the platen upon the lever 39. For that purpose, the end of the lever 39 may be provided with a plurality of apertures 41 through which may pass threaded studs 42, which are secured to and depend from the lower edge of the platen 38. These threaded studs 42 may be screws which are threaded into the platen 38, so as to depend therefrom adjacent its ends. Nuts 43 are provided upon the threaded studs 42 below the lever 39 so as to limit the separation of the platen from the lever. A plurality of screws 44 are threaded through the lever 39 and abut against the under face of the platen 38 in proximity to the studs 42, so that by turning the studs 44 in one direction, the platen will be shifted at either end away from the lever 39 until such movement is stopped by the adjustable nuts 43. The pressure created on the platen bar by the screws 44 tends to hold the nuts 43 firmly against the lever 39, so that there is little tendency for the nuts to become accidentally turned during the use of the machine. The bottom plate 45 of the casing or enclosure 1 may be provided with an aperture 46 through which access may be had to the nuts 43 and the screws 44 for adjusting the same.

The blanks, cards or sheets 36 to be printed upon are arranged in a stack and placed in an enclosure or magazine 47 (see Figs. 1, 2, 3, 5, 12, 13 and 14) with the lowermost card or blank resting upon a short plate or strip 48 and a reciprocating table 49. The plate 48 is secured at one end in any suitable manner, such as by screws 50 to a cross bar 51 which extends across the open lower end of the enclosure 47. The free end of the bar or strip 48 extends up to one end of the guide channel 31, so as to guide each card or blank resting thereon into the open end of said channel. The upper surfaces of the plate 48 and the table 49 are in substantially the same plane, and the table 49 is provided at one end with a notch or slot 52 for clearing the plate 48 as it reciprocates. The table 49, at its side edges, extends into guide grooves 53 in the enclosure 47, so that the table in its reciprocation will be directed toward and from the plate 48.

A bar 54 (Fig. 14) is secured to, and is vertically adjustable on, the end wall 55 of the enclosure 47 as by screws 54ª, this end wall terminating considerably above the plate 48. The bar 54 may extend for the full depth of the enclosure, but its lower end is adjusted so as to be spaced above the upper face of the plate 48 slightly more than the thickness of each blank or card, and slightly less than the thickness of two cards or blanks, so as to provide a clearance slot 56 (see Fig. 12) through which the blanks or cards may pass singly. During reciprocation of the table 49 toward the guide channel 31, the stack of cards, with the exception of the lowermost one, will always be held against movement with the table by engagement with the bar 54, and thus as the table reciprocates, the lowermost card or blank of the stack will be removed and shifted into the channel.

In order to facilitate the placing the stack of cards or blanks in the enclosure 47, or removing them therefrom, the end of the enclosure 47 opposite from the bar 54 may be provided with an opening 57 extending vertically the full depth of the enclosure, so that one may reach through the said opening 57 and lift out any unused blanks or cards, if occasion should require. Furthermore, in order to insure the movement of the card at each reciprocation of the table 49, the outer end of the table may have a slight upwardly extending lug or projection 58 which moves through the opening 57 as the table reciprocates. This slightly lug or projection, which is not higher than the thickness of a card or blank, will engage with an edge of the lowermost blank of the stack and positively urge it with the table toward the channel 31 which guides it into printing position. A suitable weight or pressure block 59 may be placed in the enclosure 47 upon the stack of blanks, so as to press them against the reciprocating table 49.

The plates 32 and 33 which form the upper and lower walls of the channel 31 (see particularly Figs. 12 and 13) are slotted at the ends adjoining the plate 48, so as to receive peripheral arcuate sections of feeding rollers 60 and 61. These feeding rollers are mounted respectively on shafts 62 and 63 at opposite sides of the channel 31 and normally bear against one another, but are capable of relative movement toward and from one another, so as to be slightly separable when a card or blank is conducted between the same from the plate 48 leading from the magazine or enclosure 47. The shaft 63 (Fig. 15) of the lower roller 61 may be supported at its ends in slots 64 of suitable bearings 65 projecting from the base of the enclosure or casing. The bearings 65 may be the arms of U-shaped members, and have the slots 64 in the free ends of the two arms of the U. Each arm of the U has a passage 66 extending from the slot downwardly through the bottom of the U, and a bearing block 67 is slidably disposed in each slot 64, so as to engage beneath the end of the shaft mounted in that slot. A pin 68 depends from each block 67 into the passage 66. One end of a helical compression spring 69 is confined within each passage 66 with one end fitted over the pin 68 and its other end abutting against the inner end of a screw 70 which is threaded into an aperture in the bottom plate 45 of the main casing or enclosure in alignment with each passage 66.

The U-shaped bearing member 65 may be secured to this bottom plate 45 in any suitable manner, such as by screws 72 (Fig. 7) which pass through the cross bar of the bearing member and are threaded into the plate 45. A lock nut 73 (Figs. 7 and 15) is provided upon each screw 70 for engagement with the under face of the plate 45 to lock the screw against movement from adjusted position. Thus by first releasing the lock nuts 73, the screws 70 may be shifted to a limited extent to vary the compression of the springs 69. The springs 69, acting through the blocks 67, shift the feeding roller shaft 63 toward the other feed roller shaft 62 and yieldingly hold the two rollers in peripheral contact with one another. The roller 61, because of its yieldable mounting, can separate slightly from the other roller 60 when a blank or card passes between the same, but the card will be gripped and fed between the rollers during such separation. Each feed roller may comprise two spaced spool or contact sections, as shown clearly in Fig. 7, and the shaft 62 of the roller 60 is supported for rotation in any suitable manner in the enclosure or casing 1. At one end it is provided with a bevel or miter gear 74 by which it may be driven.

At another point along the channel 31 (see Figs. 12 and 13) such as between the printing cylinder and the rollers 60 and 61, there is preferably provided an additional pair of rollers 75 and 76 mounted at opposite sides of the channel and extending slightly into the channel through apertures or slots 77 in the plates 32 and 33 of the channel so as to grip any card in the channel which may be interposed between them. These rollers 75 and 76 are mounted for rotation in the same manner as rollers 60 and 61, the lower roller 76 being yieldingly mounted the same as roller 61. The shaft 78 of the upper roller 75 also extends rearwardly parallel to the extension of shaft 62 and likewise carries at its end a bevel or miter gear 79 (see Fig. 2) by which it may be driven. These bevel gears 74 and 79 mesh with and are driven by bevel gears 80 and 81 respectively (Fig. 2) which are fixed upon the shaft 82. The shaft 82 extends across the rear of the machine and serves as a common operating means for both sets of feed rollers 60, 61 and 75, 76. From the foregoing it will be observed that when a blank or card is shifted by the table 49 to the open end of the channel 31, it will be gripped by the rollers 60 and 61 and propelled along the channel guide to the rollers 75 and 76, which will in turn propel it farther along the channel or guide into printing position, the blank or card leaving the rollers 75 and 76 as it reaches printing position.

At the end of the printing cylinder 27, opposite from the rollers 75 and 76, we may provide ejector rollers 83 and 84 (see Figs. 12, 13, 17, 18 and 19). These rollers have arcuate sections extending into the channel or guide 31 from opposite faces thereof and projecting through apertures or windows 85 provided in the upper and lower plates 32 and 33 of the channel. The upper roller 83 is fixed upon a shaft 86 which is rotatably mounted in suitable bearings 87 (Figs. 2 and 17) and this shaft, which extends rearwardly, carries at its rear end a bevel pinion 88 which meshes with a gear 89 on the shaft 82 before mentioned.

The lower roller 84 is fixed upon a shaft 90 and the ends of the latter are slidingly mounted in vertical slots 91 (Fig. 3) provided in bearing blocks 92 (see Fig. 17) secured upon the base 45.

The shaft 90 is pressed upwardly in the slots 91 so as to carry the roller 84 into contact with the roller 83, by blocks 93 similar to the blocks 67 of Fig. 15. These blocks have pins 94 depending into passages 95 extending through the bearing blocks 92 and the bottom plate 45. Helical springs 96 are confined in the passages 95 with their inner ends fitting over the pins 94 and bearing at their outer ends against screws 97 which are threaded into the passages 95 at the plate 45. The screws 97 have lock nuts 98, and by adjusting the screws 97, one may tension or compress the springs 96 and vary the force with which the roller 84 is pressed against or toward the upper roller 83. The shaft 90 of the lower or floating ejector roller 84 extends beyond the bearing blocks 93 (see Fig. 17) so as to be engaged by angular arms 99 of levers 100 (see Figs. 3, 17, 18 and 19). There are two levers 100, each fixed upon a shaft 101 and the latter carries an arm 102 (see Figs. 2 and 3).

The arm 102 extends beneath the lower end of a rod 103 which is mounted for vertical reciprocation, its upper end terminating in contact with the periphery of a cam 104 which is fixed upon a shaft 105. Thus, when the rod 103 is depressed, it will depress the arm 102 (Fig. 3) and rock the shaft 101 and angular arms 99 of the lever 100 in a direction to depress the shaft 90 and carry the ejector roller 84 out of the channel 31 and therefore out of feeding engagement with ejector roller 83, which condition is shown in Fig. 18. When the cam 104 is rotated with the shaft 105 so as to release the rod 103, the latter will be moved upwardly by the arm 102, which is in turn rocked upwardly through the action of the springs 96 upon the shaft 90 and through the latter upon the levers 100.

As the arm 102 is moved upwardly in this manner, the shaft 90 will of course rise and carry the ejector roller 84 into driving engagement with the ejector roller 83, as shown in Fig. 19. The ejector rollers 83 and 84 are disposed in position to receive between them the forward end of a blank which has been shifted into printing position, and hence when the lower roller 84 is released for driving engagement with the upper roller 83, the interposed card or blank will be removed from printing position by the ejector rollers 83 and 84. The channel 31 terminates at the upper part of a receiving basket 106, so that the cards or blanks removed from the channel 31 by the ejector rollers will be deposited in the basket in the order in which they are removed. A leaf spring 107 may be secured to the discharge end of the channel 31, so as to yieldingly engage and direct the cards or blanks downwardly as they enter the basket 106.

The shaft 105 extends across the machine and is rotatably supported in the side wall of that compartment of the enclosure 1 which houses the printing drum 27. This shaft 105 also carries a cam 108 (see Figs. 2, 5 and 16) which operates a reciprocatory rod 109. The other end of this rod 109 bears upon an arm 110 (Figs. 2, 3, 5 and 13) which is fixed upon a shaft 111. The shaft 111 extends parallel with the shaft 63, and is rotatably mounted in suitable bearings in the enclosure. The shaft 111 extends beneath the channel guide 31 and carries a depending arm 112 which at its free end is pivotally connected by pin 113 to one end of a link 114, the latter at its other end being pivotally connected by pin 115 to a lug 116 depending from the reciprocating table 49.

Thus the cam 108 acting through the rod 109, the arm 110, shaft 111, arm 112 and link 114 shifts the reciprocating table toward the open end of the channel guide, so as to carry the lowermost blank between the feeding rollers 60 and 61, the latter then propelling the card or blank further along the channel guide. A tension spring 117 is connected at one end by a pin 118 to the depending arm 112, (Figs. 2, 3 and 13) and at its other end is connected to a suitable pin 119 on the base 45. The spring 118 is further tensioned during a movement of the table 49 to carry a blank to the feed rollers and when the rod 109 is released by the cam 108, the spring 117 will return the table 49 to its rearward position, as shown in Figs. 3 and 12.

A pinion 120 (Figs. 2 and 3) is fixed on the shaft 82 and meshes with and is driven from a gear 121. The gear 121 is mounted on a stub shaft 122, and the latter has fixed thereon a pinion 123 which meshes with and is driven from a gear 124 fixed upon the shaft 105 (see also Fig. 16). Thus all of the apparatus for feeding the blanks or cards into and out of printing position will be driven by or operated from the shaft 105. Another cam 125 (Figs. 2, 4, 16 and 21) is fixed upon the shaft 105 and acts upon one arm of the lever 39, the latter being held in contact with the periphery of the cam 125 by a spring 126 which is connected at one end to the lever 39, and at its other end to one of the lugs 15 (Fig. 4). Thus the shaft 105 during its operation will also operate the platen to effect a printing upon any blank or card in printing position.

Referring now particularly to Figs. 2, 4, 7 and 16, a worm wheel 127 is rotatably mounted on a bushing 128 encircling the shaft 105, and meshes with and is driven by a worm screw 129 keyed to a shaft 130 which is rotatably mounted in a U-shaped bearing structure 131 (Fig. 4). Suitable ball or roller bearings 132 are provided between the ends of the worm screw and the arms of the bearing structure 131 to take up end thrust of the worm screw with a minimum of friction. The shaft 130 is coupled through a clutch device 133 to the drive shaft 134 of a suitable motor or other source of power 135. The motor may run continuously, and therefore the worm wheel 127 will be driven continuously.

The worm wheel 127 carries at one of its faces a ratchet wheel 136. A disk or member 137 is mounted on the shaft 105 adjacent the ratchet wheel 136, and a double legged pawl 138 (see Fig. 10) is mounted by a pivot pin 139 connecting the legs of the pawl upon the disk or member 137 with the legs extending on opposite faces of said disk, (see Fig. 2).

The disk or member 137 is provided with a bearing boss 140 which extends away from the ratchet wheel, the disk 137 and its bearing boss being confined somewhat loosely against the ratchet wheel by a suitable arm 141 fixed on the shaft 105. A second member or plate 142 is oscillatably mounted on the bearing boss 140 of the member 137, and is spaced from the disk 137 by a suitable spacer ring 143. A second spacer ring 144 confines the second member or plate 142 against the end of the spacer ring 143 and this second spacer ring 144 is secured to the bearing boss 140, over which it fits, by a locking pin 145 which extends through this spacer ring, the bearing boss 140 and the shaft 105, so that the member 137 will always rotate with the shaft 105. The second member or plate 142, however, is capable of oscillation upon the bearing boss 140 of the member 137. The plate or member 142 is provided with an elongated slot 146, the ends of which are at different radial distances from the axis of the shaft 105, as clearly shown in Figs. 8 and 9.

A pin 147 projects from one of the legs of the pawl 138 into the slot 146, so that when the member or plate 142 is oscillated on the bearing boss 140, the cam slot 146 will move the pin 147 toward or from the shaft 105 depending upon the direction in which the plate or member 142 is shifted relatively to the disk or member 137. This movement of the pin 147 toward or from the shaft 105 causes a rocking of the nose of the pawl out of and into engagement with the teeth of the ratchet wheel 136. When the pawl is in engagement with the teeth of the ratchet wheel, the worm wheel will, through its ratchet wheel, be drivingly connected to the disk or member 137 and through it to the shaft 105. In such a condition, the motor 135 will drive the shaft 105, and the parts operated or controlled thereby. A helical spring 148 is connected at one end of the member or plate 142 and at its other end to the disk or member 137, as shown in Figs. 7, 8 and 9, so as to yieldingly urge the plate or member 142 in a direction relative to the disk or member 137, such that the pawl 138 will be rocked into engagement with the ratchet wheel and thereby couple the motor 135 to the shaft 105.

An escapement rock shaft 149 is mounted in the enclosure or casing in the path of movement of an arm or end of the plate or member 142, so that the latter will engage with this escapement shaft and be held thereby at the end of each rotation of the shaft 105. The plate 142 is shown as so held in Fig. 7, and when held in this manner by the escapement shaft 149, the ratchet wheel will continue to drive the pawl and through it the disk or member 137. During such relative movement of members 137 and 142, the spring 148 will be tensioned and the cam slot 146 will hold the pawl out of engagement with the ratchet wheel to break the driving connection between the shaft 105 and the motor.

A bell crank lever 150 is pivoted at 151 and is yieldingly urged by a spring 152 connected to one arm thereof against a fixed stop 153, in which its other arm is in the path of rotation of the outer end of the arm 141 previously referred to. As the arm 141 engages the bell crank 150, it will cam the bell crank away from its fixed stop 153 and as it passes the bell crank, the latter will snap in behind it, as shown in Fig. 7. This bell crank snaps behind the arm 141 at just about the time that the pawl is disengaged from the ratchet wheel, so that upon such disengagement, the shaft 105 will be held against reverse movement under the influence of the spring 148. Otherwise the spring 148 would tend to move the shaft 105 in a reverse direction and cause a reengagement of the pawl with the ratchet wheel.

The escapement shaft 149, at the section engaged by the plate or member 142, is provided with a slot or kerf 154 through which the plate or member 142 may pass when the escapement shaft is rocked into one position, such as shown in Fig. 8. The escapement shaft is therefore in the nature of a shiftable abutment for holding or releasing the plate or member 142. A spring 155 is connected under tension to an arm 156 fixed upon the escapement shaft 149, and yieldingly urges the latter into position, such as shown in Fig. 7, in which it obstructs the passage of the plate or member 142. If the escapement shaft is rocked to permit the escape or release of the plate or member 142, the spring 148 will immediately shift this plate or member in a direction to cause its cam slot to rock the pawl 138 into engagement with the ratchet wheel and couple the motor to the shaft 105. The shaft 105 will then be driven until the plate or member 142 is again held by the escapement shaft, at which time the continued movement of the disk or member 137 carrying the pawl will cause a movement of a pawl pin 147 along the cam slot 146 of the plate or member 142, with resulting disengagement of the pawl from the ratchet wheel and breaking of the driving connection between the shaft 105 and motor 135.

The rocking of the escapement shaft 149 and the consequent actuation of the various operative mechanisms of the machine, as above described, is preferably effected through the operation of the actuating means for the printing drum 27, or by means associated with, and operable together with said means. In the construction shown, a ring 157 (Figs. 2, 7 and 8) is fixed upon the escapement shaft 149 and is provided in its periphery with a slot 158 (see Fig. 2) which receives one end of a link 159, the latter being pivoted to the ring 157 by a pivot pin 160, (Figs. 2 and 8). The other end of the link 159 is connected by pivot pin 161 to one end of a lever 162, which is pivoted at 163 to a bracket 164 carried by the bar 11 (see Fig. 4). The other end of the lever 162 extends beneath the sleeve 7 (Figs. 3 and 4). A rod 165 is mounted in the sleeve 7 for sliding movement endwise thereof, and extends beyond both ends of the sleeve 7. At its lower or inner end the rod 165 bears upon the adjacent end of the lever 162, and at its upper or outer end the rod carries an operating arm 166.

The operating arm 166 extends over the arm 8 by which the cylinder is adjusted, and a pin 167 depends from the free end of the arm 166 and is slidingly received in an aperture 168 in the free end of the arm 8, so that while the arm 166 will always be rotated with the arm 8, the former may be shifted toward and from the latter in any angular position of the arm 8. The shifting of the arm 166 toward the arm 8 will cause an endwise movement of the rod 165 in the sleeve 7, and this in turn will cause a rocking of the lever 162 and through it will rock the escapement shaft from the position shown in Fig. 4 to the position shown in Fig. 8.

The spring 155 in returning the escapement shaft into holding position as shown in Fig. 4, acts through the link 159 and lever 162 to elevate the rod 165 and the handle or arm 166. The elevation of the rod 165 and arm 166 may also be facilitated by a helical compression spring 169 which is confined on the pin 167 and interposed under compression between the arms 8 and 166. The extreme lower end of the pin 167 has a tapered point which is adapted to enter any one of an annular series of apertures 170 provided in the dial plate 3.

The apertures 170 are spaced apart according to the movements of the arm 8 necessary to shift the printing arm or cylinder 27 a distance which will bring a new type character group in position for printing. The apertures 170 are also so placed that when the tapered end of the pin 167 is pushed into the same, a type character on the printing drum 27 will be properly positioned for printing. If an attempt is made to depress the arm 166 when the pin 167 is only slightly out of alinement with an aperture 170, the tapered end will cause a camming action upon the arm 8 as the pin 167 enters the aperture, and thus will cause a shifting of the printing drum into proper printing position before permitting movement of the arm 166 sufficient to rock the escapement shaft an extent that will release the plate or member 142. If the pin 167 is entirely or partially misalined with any aperture 170, the dial plate 3 will not permit movement of the pin 167 and arm 166, thus preventing the release of the member 142 by the escapement shaft 149. The untapered part of the pin body must move downwardly through an aperture 170 for a relatively material distance before the escapement is released, thus always insuring perfect printing alinement before an operation is initiated. Thus the motor will never be coupled to the shaft 105 unless the printing drum is in proper printing position. Since the arm 8 rotates about the axis of the sleeve 7, the row of apertures 170 will be arranged circularly about the same axis.

When a card or blank is propelled along the guide or channel 31 into printing position, it will be moved with considerable velocity and momentum, and it is desirable to stop this movement when each card or blank is exactly in printing position. For this purpose one or more stop arms 171 (Figs. 2, 3, 17, 18 and 19) are pivotally mounted just below the outlet end of the channel, on studs 172, and each arm has a projection or lug 173 which is adapted to move upwardly through apertures or slots 174 in the upper and lower walls of the channel or guide, into the position shown in Figs. 17 and 18. When the arms 171 are in the position shown in Figs. 17 and 18, the lugs or projections 173 will obstruct the passage through the channel or guide 31, and will therefore limit movement of the blanks or cards along the channel. The rollers 75 and 76 are so spaced from the stop lugs 173 that they prevent material rebound of the cards or blanks from such lugs, thus accurately and automatically positioning the blanks for the printing operation. The projections 173 are so placed that when the cards or blanks 36 travel along the channel or guide 31, and are stopped thereby, they will be in printing position, as shown in Figs. 2 and 18. When a card or blank is thus stopped in printing position, a small area of the same will be visible through the window 85 in the upper plate 33 of the channel or guide 31 through which window the upper feed roller 83 extends for engagement with the blank or card. This visible area of the blank or card in printing position is clearly shown in Fig. 2 by the shaded area.

Each arm 171 is provided with an oblique cam surface 175 which rides upon the upper edge of a cross bar 176, which in turn extends between and connects the levers 100 as shown in Figs. 17, 18 and 19. When the levers 100 are rocked in a direction to shift the ejector roller 84 out of driving engagement with the roller 83, the bar 176 will act upon the cam surfaces 175 of the two arms 171 and move these arms upwardly into blank obstructing position, as shown in Figs. 17 and 18. At the conclusion of the printing operation when the levers 100 are rocked in the reverse direction from the position shown in Figs. 17 and 18 to the position shown in Fig. 19, the bar 176 which connects the levers 100 will travel along the cam surfaces 175 and release the arms 171 for descent.

A spring 177 connected between each arm 171 and the cross bar 176 yieldingly urges that arm 171 downwardly to the extent permitted by the bar 176, so that the cam surfaces 175 will always ride upon the cross bar 176. Thus when the lower ejector roller 84 is released for movement upwardly into driving engagement with the upper ejector roller 83, the obstructing arms 171 will be pulled downwardly by the springs 177 so as to remove the projections 173 from obstructing positions. The interposed card or blank 36 which at that time is in printing position with one end between the rollers 83 and 84, will then be propelled farther along the channel or guide and be ejected therefrom and deposited in the basket 106.

Suitable provision is made for inking the type characters which are in printing position, and for this purpose, referring particularly to Figs. 4 and 7, the lateral wall of the casing or enclosure 1 at one side of the printing drum 27 and at a point adjacent the guide or channel 31 is provided with a window 178 which is normally closed by a plate 179, the plate being removably confined over the window in any suitable manner such as by screws 180. A pair of spring arms 181 are secured to the inner face of this closure plate 179, and these spring arms at their free ends rotatably mount the bearing ends of an inking roller 182 which is charged with ink and which is yieldingly pressed against the surface of the drum 27 at a point adjacent or near the channel guide 31, that is, as near as possible to the actual printing line of the cylinder. This inking roller may be recharged with ink by merely detaching the plate 179 to remove and expose it.

A second inking roller 183 is disposed in a similar position at the other side of the channel or guide as shown clearly in Fig. 4, and the bearing ends of this roller 183 extend through similarly elongated slots 184 in opposite walls of the enclosure or casing 1. These slots 184 extend lengthwise, substantially radially of the shaft 29 (Fig. 4), so that the roller 183 may be shifted bodily toward and from the shaft 29 for a limited extent, and during which movement it will be brought into or out of contact with the peripheral surface of the printing drum. A pair of helical springs 185 are connected to links 186 which engage with the bearing ends of the inking roller 183, and with suitable parts of the casing or enclosure 1, so as to urge the inking roller 183 yieldingly along the slots 184 and into contact with the peripheral surface of the printing drum.

This inking roller 183 being disposed farther in the interior of the enclosure or casing 1 than the other inking roller 187, is less accessible for recharging with ink, and therefore a special charging device is provided for this purpose. This charging device includes an auxiliary ink carrying roller 187 (see Figs. 4 and 20) which is provided at its ends with bearing extensions 188 that are rotatably mounted in bearings 189 and 190. The bearing 189 may comprise a depending ear of a sheet metal plate 191, which is slidably mounted in oppositely disposed grooves 192 of a supporting plate 193. The enclosure or casing 1 is provided with a window 194 adjacent one end of the grooves 192, so that the strip 191 may be removed form the supporting strip 193 by sliding it endwise through the open window 194 as shown in Fig. 20.

Figure 6:
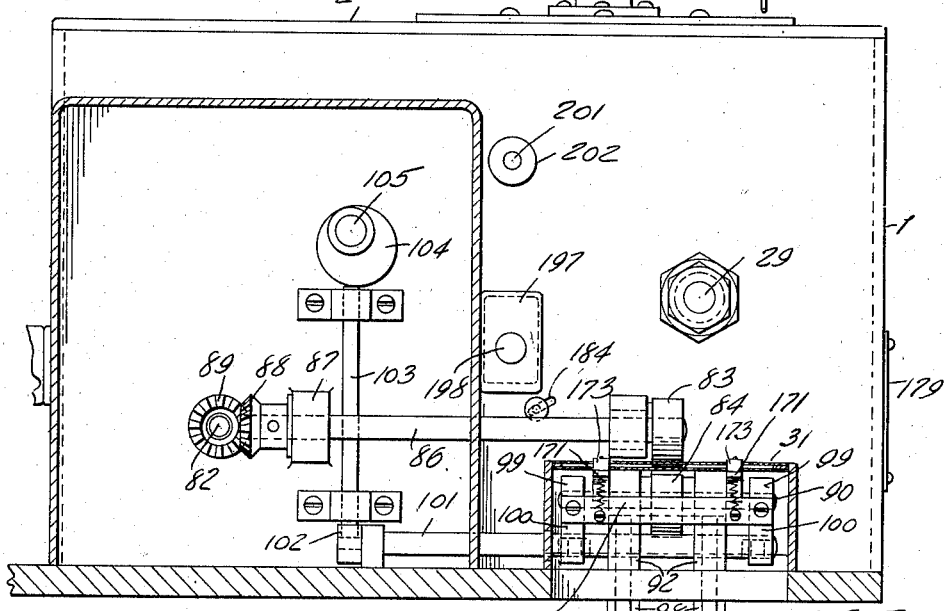
Fig. 6 is still another sectional elevation of the same, with the section taken approximately along the line 6—6 of Fig. 2.

The bearing 190 may comprise one arm of an angle piece which is secured in any suitable manner, such as by rivets 195, to the strip 191, and the strip 191 may at the end carrying the angle piece 190 have an angular end 196 which is secured to the inner face of a closure plate 197 of such a size that when the strip 191 is shifted inwardly into the casing or enclosure 1, the plate 197 will limit this inward movement and by abutting against the outer face of the enclosure 1, close the window 194, as shown in Fig. 6. A button 198 may be secured to the outer face of the plate 197 such as by the rivet or screw 199 which secures the plate 197 to the angular end 196 of the strip 191. Through the button 198, the strip 191 may be more readily shifted into and out of the casing, as shown in Fig. 20.

The supporting strip 193 is attached to the cross bar of a U-shaped support 200 (see Fig. 20) which extends across the interior of the printing drum-containing section of the case or enclosure 1 and having its side arms slidably supported by the enclosure or casing 1. By this sliding connection between the casing 1 and the support 200, the roller 187 may be shifted into and out of contact with the inking roller 183, so that when in contact therewith, a transfer of ink from the auxiliary roller 187 to the roller 183 may occur. A shaft 201 disposed above the roller 187 extends between and is rotatably supported by opposite walls of a casing 1 (Fig. 20) and at one end extends through the casing 1 and carries an operating button 202.

Suitable rings 203 are fixed to the shaft 201 within the casing 1, and each ring 203 carries eccentrically a pin 204 which is connected to the free end of a hook shaped portion of a link 205, there being one link 205 at each side of the casing 1. The opposite ends of the links 205 are pivotally connected by pins 206 to the support 200, so that when the button 202 and shaft 201 are rotated, the support 200 will be shifted toward or from the inking roller 183, so as to carry the auxiliary roller 187 into or out of engagement with the roller 183. These rollers 183 and 187 are shown as in contact with one another in Fig. 4.

It will be observed that when the shaft 201 is rotated in a direction to immediately separate the rollers 187 from the rollers 183, the hooked ends of the links 205 will be carried over and deposited upon the shaft 201, as shown in Fig. 7. When this occurs, further movement of the shaft 201 will be prevented, and the weight of the support 200 and roller 187 will hold the links 205 in hooked position over the shaft 201. At intervals when reinking of the roller 183 is desired, the shaft 201 may be rotated to lift the hooked ends of the links 205 off the shaft 201 and shift the support 200 downwardly into the position shown in Fig. 4.

In Fig. 22 a suitable blank or card 36 is illustrated in detail, and this card represents a simple mailing card or bill that may be employed by public service corporations such as a gas company or electric light company. In such cases the bill is usually provided with two sections both bearing the amounts payable, so that one-half may be retained by the company when the bill is paid, and the other half receipted and returned to the customer as a receipt. At the left end of the bill or card 36 a suitable rectangle or area 207 may be provided in which the bookkeeper can make an entry of the number of units of service, such as quantity of gas or electricity consumed, and for which payment must be made. In the particular blank illustrated in Fig. 22, the number entered in the rectangle 207 is the number 20, indicating, for example, that 20,000 cubic feet of gas have been consumed and are to be charged for. Heretofore the bookkeeper has computed and entered upon the bill or card the gross amount payable for this particular consumption of gas, the discount if the bill is paid within a specified time, the net amount so payable, and upon the stub or end to be retained by the company upon payment of the bill, the gross and net amounts also are entered. Frequently separate rubber stamps are provided for each unit of consumption beginning with one and running up as far as necessary to include the maximum amount or number of units which are likely to be consumed by any customer, and the clerk or bookkeeper seeks the stamps for the particular number of units to be entered, inks the stamp by placing the stamp against an inking pad, then stamps the bill or card and returns the stamp to its proper position. This requires quite a number of different manual operations for each card, with the result that the number of cards or bills which can be handled by any clerk is limited.

The apertures 170 (Fig. 1) which determine the printing positions of the cylinder (see Fig. 1) are numbered consecutively from one up, and when the arms 8 and 166 are brought into alined position over any aperture, the particular type character carried by the printing drum in printing position at that time will contain the same number as found at that particular aperture 170 and also the computed gross and net payments and discount properly spaced for printing entirely or partially in duplicate upon both sections of the card or bill. Then if the arm 166 is depressed sufficiently to initiate a coupling of the motor to the shaft 105, the bill or card will have printed thereon the proper gross, net, and discount items and number of units of consumption for which they stand. One may then by comparing the number of units printed with the number found in the rectangle 207 placed there by the bookkeeper check by mere inspection the correctness of the printing operation. That is, if the number of units consumed as printed by the machine corresponds to the number of units found in the rectangle 207 one will know the amounts printed as payable are correctly computed.

When the cards are in printing position in the machine, as shown in Fig. 2, the rectangle 207 will appear in the window 85, so that the number placed in that rectangle by the bookkeeper will appear through the window as information for the operator of the machine or device in setting the printing drum for that operation. In Fig. 2 the number appearing through this window is 16, indicating that 16 units are to be charged, and the operator of the printing device then turns the arms 8 and 166 to the aperture numbered 16 and then depresses the arm 166 to cause a printing operation. In this printing operation, the card printed upon is ejected and a new one placed in printing position, and the operator then sets the machine to print the new number then appearing through the window 85.

In the operation of a printing device constructed as hereinbefore described and illustrated, the cards having the proper initial entry within the area or rectangle 207 are placed, faces up, in the magazine or enclosure 47, and the weight 59 then placed upon the top of the stack. The operator then sets the arms 8 and 166 in any printing position whatever and depresses the arm 166 to cause a cycle of operation of the machine. This cycle of operation causes a transfer of the lowermost card of the stack into printing position, with the item to be charged appearing thereon through the window 85, as shown in Fig. 2. The operator then adjusts the arms 8 and 166 to the aperture 170 having the same number as that which appears in the window 85, which in the example of Fig. 2 would be the dial aperture numbered 16. The arm 166 is then depressed to cause a cycle of operation of the device, during which the amounts payable and the number of units charged for will be printed in duplicate or otherwise, as desired upon the card or blank, that card ejected from printing position and placed in the basket 106, and the next lowermost card transferred into printing position. Thus the operator by a single operation causes the printing of all of the information which heretofore has required a multiplicity of time consuming manual operation of a clerk, and the automatic feeding and ejecting of the blanks or cards.

When the arm 8 is adjusted over any particular aperture 170 in the dial plate, the printing drum will of course be set to print the proper computation for the units to which that aperture corresponds. The oscillation of the printing cylinder will cause a rolling contact between the inking rollers 182 and 183 and the type characters upon the printing drum, and since the number of units to be charged for, in successive bills usually vary considerably, the oscillation of the printing drum during its adjustments will be sufficient to keep all of the type characters adequately inked, but if the units to be charged for are almost the same in successive bills, the operator should give the arms 8 and 166 short oscillations to one side or the other at frequent intervals, so as to insure adequate inking of the type characters.

When the arm 166 is depressed, it of course rocks the escapement shaft and causes a coupling of the motor with the shaft 105 and, as a result, the shaft 105 will be driven through a single rotation and stopped, it being assumed that during this interval the operator has released the arm 166 so that the escapement shaft 149 has returned to a position in which it stops the plate or member 142. The cams 104, 108 and 125 are so placed angularly with respect to one another upon the shaft 105, that the feeding and printing operations will occur in proper sequence, that is, at the beginning of a cycle of operation of the shaft 105, the printing cam will first be effective to cause a printing operation upon the card in position at that time, and a retraction of the platen from printing position, and then immediately following, the cam 104 will permit an elevation of the rod 103 and a consequent release of the lower ejector roller 84 which then moves into feeding engagement with the other roller 83. At the same time the obstruction lugs 173 drop into inactive position, and the card in printing position is removed and deposited in the basket 106.

During this operation, or immediately thereafter, the cam 108 will be depressed, with the result that the table 49 is shifted toward the feeding rollers 60 and 61, so as to convey the lowermost card or blank of the stack into the open end of the channel 31 and between the rollers 60 and 61. During the entire operation of the shaft 105, it will be understood that the feed rollers 60, 75 and 83 will all be operated continuously and therefore when a card or blank is placed in operative relation thereto, it will be propelled along the guide or channel 31. Hence, when the lowermost card of the stack is shifted into feeding relation to the rollers 60 and 61, the card will be gripped and propelled along the channel and into feeding engagement with the rollers 75 and 76 before it is released by the rollers 60 and 61.

The rollers 75 and 76 continue the movement of the card or blank along the channel into printing position and release the card or blank just before the contact of the card with the obstruction lugs 173 which have in the meantime been elevated into the obstructing position shown in Fig. 18. The card is thus stopped in printing position out of the influence of the feeding rollers 75 and 76 and between the ejector rollers 83 and 84, although the latter rollers are at this time out of driving engagement with one another, that is, they are separated so that the card or blank will remain in printing position during the remainder of the cycle of operation of the shaft 105.

It will be observed that by a mere adjustment of the arms 166 and 8 into a particular set position and the depression of the arm 166, the machine will automatically print any desired information upon a blank, eject that blank and substitute another blank in printing position without further attention or guidance from the operator. Therefore the speed at which the bills, cards, or blanks may be printed upon is greatly increased over the old method of using individual rubber stamps or other methods, as heretofore commonly employed for this purpose, and one clerk operating this machine can print more blanks or cards than many clerks working under the old system of individual stamps.

Figure 25:
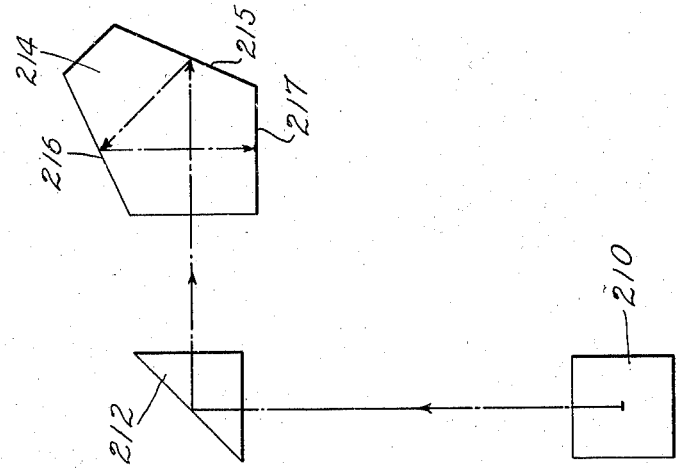
Fig. 25 is a plan of the same.

Inasmuch as the window 85 (Fig. 1) is at a level considerably below the dial plate 3, it would be necessary for an operator to shift his eyes between the dial plate 3 and the window 85, alternately at each operation of printing upon a blank or card. This not only imposes a considerable eye strain upon the operator, but slows down the operation of the machine. Therefore, we preferably employ an optical system for projecting images of the portoin of any blank or card appearing in the window 85 to a point closely adjacent the dial plate 3, so that it will be unnecessary for an operator to shift the eyes for any material extent at each operation of the machine. An optical system suitable for this purpose is illustrated diagrammatically in Figs. 23 to 25 inclusive and in perspective in Fig. 26. Referring now to these figures, a magnifying optical element or lens 208 may be mounted directly above the window 85 in any suitable mounting 209 which preferably permits adjustment of the lens or lenses to a limited extent toward and from the window 85 for the purposes of obtaining a focus. Such an adjustable mounting is shown by the pin and oblique cam slot in Fig. 26, but any suitable or usual adjustment for an optical lens or element may be utilized.

Directly above the optical element 209 we may dispose a reflecting prism or mirror 210 mounted in any suitable manner, such as by bracket 211, so as to reflect rearwardly the image or light rays received from the optical element 209. A second reflecting prism or mirror 212 is mounted rearwardly of the prism 210 in any suitable manner, such as upon a bracket or support 213, so as to receive the light rays or image projected from the prism 210 and reflect the same sidewise, that is, in a horizontal plane at angles to the incident rays. A double reflecting prism or mirror device 214 may also be mounted on the bracket or support 213, so as to receive the rays reflected from the prism 212. This double prism 214 is provided with an oblique reflecting surface 215 which first receives the light rays or image from the prism 212 and reflects the same to a second reflecting surface 216. The surface 216 reflects the image or light rays directly forwardly and projects the same upon a ground glass surface or screen 217 located in proximity to the dial plate 3, preferably just in the rear of and slightly above the plate 3, so that the operator may view the image on the surface or screen 217 while looking generally in the direction toward the dial plate 3 and the operating arms 8 and 166. Thus an operator may observe the image of the window 85 without materially shifting the eyes from the dial plate 3 and the operating arms 8 and 166. This enables exceptionally rapid operation of the machine, since the numerals on the blanks or cards and appearing successively in the window 85, and projected in image upon the surface or screen 217 may be observed easily by the operator while looking at the arms 8 and 166 which are manipulated to set the printing mechanism.

Figure 26:
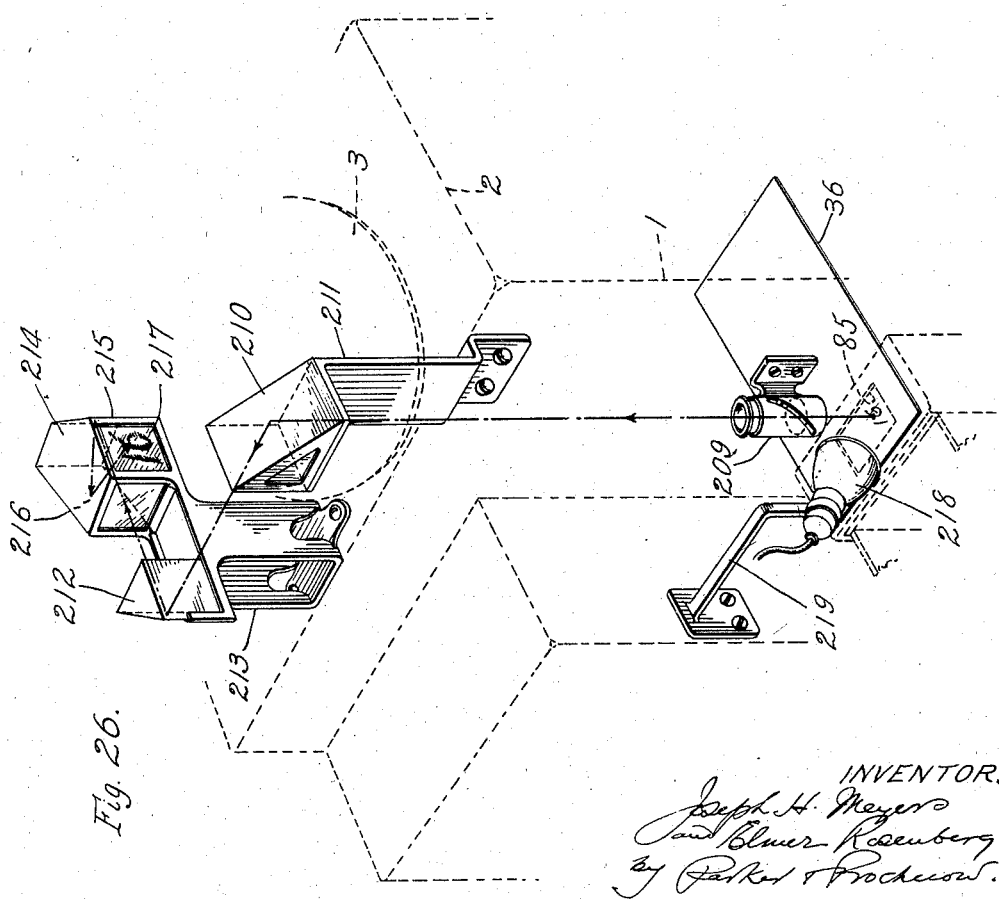
Fig. 26 is a perspective of the optical system, and illustrating its application to the machine disclosed in Fig. 1.

The visibility may be improved by a suitable illuminating device 218 mounted in any suitable manner, such as by bracket 219, at one side of the window 85, so as to directly illuminate by oblique rays the portion of each card or blank visible through the window 85. The various parts of the optical apparatus may be mounted upon any suitable and convenient parts of the machine frame, as shown in Fig. 26. By the use of the magnifying element 208 the image of the window 85 will be magnified to such an extent that it will be easily visible by the operator and in such a scale that the likelihood of error in reading the same is very greatly reduced, even though the observations thereof, or the readings taken therefrom will be in rapid succession. The magnifying element 208 may be a simple magnifying lens, as shown in Figs. 23 and 24 adjustable toward and from the window, so that the surface of the card or blank exposed through the window may be at the focus of the lens. When the card surface is at the focus of the lens, the light rays from the blank or card and leaving the lens 208 will be parallel and will remain parallel through the various successive reflections until projected upon the screen 217.

While the invention has been described in connection with the printing of public service bills, for which use it is particularly advantageous, it will be understood that the device is equally useful in filling in the amounts of checks or other documents, or for printing other or similar information which can be selectively varied by key numbers. For example, in the filling out of dividend checks by corporations, the key number by which the apertures 170 of the dial plate are designated may correspond to shares of stock which the particular party owns and which item will be found upon the check for that party. The operator than sets the machine to print in accordance with that unit number, and the proper amount of dividend for that number of shares will be automatically printed upon the amount spaced on the check and stub in a single operation, and a new check substituted in position for printing. Of course, different printing cylinders will be required for different rates of dividends. Such a printing device may also be advantageously used in computing payrolls for groups of employees having standard rates of pay in which the key numbers represent the number of hours worked during any given period for which the payment is to cover. Many other examples will suggest themselves to those skilled in the art and are contemplated within the principle and scope of this invention.

It will also be understood that various changes in the details which have been herein described and illustrated in order to explain the principle of the invention as applied to one example, may be made by those skilled in the art within the principle and scope of the invention as expressed in the appended claims.

We claim:

1. In a printing device, a support for a sheet to be printed upon, a type carrying member selectively adjustable to present selected type in printing position at the desired place on said sheet to be printed, means for pressing said sheet against the type which are in printing position at any time so as to transfer an impression to said sheet, means including a selectively adjustable indicating element for selectively setting said type carrying member in positions to print selected type, and means controlled by said indicating element for causing operation of said pressing means, for ejecting the sheet after printing, and inserting another blank sheet in printing position automatically.

2. In a printing device, a guide for supporting a blank in printing position, a type carrying member adjustable to present selected characters thereof in printing position against a face of said blank, a platen disposed on the opposite face of said blank from said type carrying member, means for causing relative movement of said platen and type carrying member toward one another to transfer an imprint from the type to the blank, an indicating element, means controlled by the indicating element for shifting said type carrying member to present selected characters in printing position, and means for causing a printing operation and then ejecting the blank and presenting another blank in printing position.

3. In a printing device, printing mechanism, means for feeding sheets to be printed upon into and out of position, means for selectively adjusting said printing mechanism to print selected characters, including an adjustable indicating element, a member movable with said indicating element and also shiftable independently thereof, and means operable by said member when moving independently of said element for automatically causing a printing operation and then ejecting the sheet being printed upon and substituting a new blank sheet.

4. In a printing device, printing mechanism, means for feeding sheets to be printed upon into and out of printing position, means for selectively adjusting said printing mechanism to print selected characters including an adjustable indicating element, a member movable with said indicating element, and also shiftable independently thereof, and means operable by said member when moved independently of said element for automatically causing a printing operation and then ejecting the sheet being printed upon and substituting a new blank sheet.

5. In a printing device, printing mechanism, means for feeding sheets to be printed into and out of position, means for selectively setting said printing mechanism to print selected characters upon any sheet in printing position, said means including an adjustable indicating element, a member movable with said indicating element during its adjustment and also movable in a different direction independently of said element, means for operating said printing mechanism, and an escapement device normally preventing operation of said printing means and said feeding means being operable by the movement of said member independently of the indicating element to release the printing mechanism operating means and the feeding means to cause first a print upon a sheet, the ejection of that sheet, and the substitution of another.

6. In a printing device, printing mechanism, a guide for conducting blanks to be printed upon successively through printing position with respect to said printing mechanism, means for setting said printing mechanism to print selected characters and including an adjusting element settable to determine the characters to be printed, means for supporting a supply of blanks to be printed upon, means for removing said blanks successively and sending them along said guide into printing position, means for removing the blanks from printing position, common means for both of the blank operating means and said printing mechanism, for causing first a printing operation upon a blank in printing position and then ejecting the old blank and placing a new one in printing position, and means for selectively rendering said common operating means effective to print and change the blanks.

7. In a printing device, a printing mechanism, a guide for conducting blanks to be printed upon successively through printing positions, means associated with said guide for receiving the blanks and conducting them into printing position, means for supporting a supply of blanks and presenting them successively to said blank conducting means for movement into printing position, a stop movable across the plane of the guide for stopping said blanks in printing position when conducted into printing position by said conducting means, ejecting mechanism for removing said stop from the path of said blanks, and then removing said printed blanks from printed position, common operating means for operating said printing mechanism, and then operating said ejecting mechanism, said conducting means, and said presenting means in a related order to cause the ejection of a blank and its replacement by a new one to be.

8. In a printing device having printing mechanism, a guide for conducting blanks successively through printing position, rollers disposed on opposite faces of the plane of said guide and mounted for relative movement toward and from one another to engage or release a blank interposed between them, a stop movable relatively to the guide to stop a blank in printing position or release it, a common source of power, and means operable thereby for automatically withdrawing the stop from obstructing position and causing relative approach of said rollers to grip the interposed blank and eject it from printing position in said guide, and then return the stop into obstructing position.

9. In a printing device, printing mechanism, guiding means for conducting blanks successively through printing position, feeding rollers disposed on opposite faces of said guiding means, one of said rollers being spring pressed toward the other for pressing an interposed blank firmly into contact with both rollers, whereby said rollers may propel it along the guide, a member normally holding said movable roller away from said blank and other roller and movable to release said roller to permit its movement into engagement with the blank, a stop movable relatively to the guide to obstruct passage of said blanks beyond printing position and biased for movement in a direction out of obstructing position, said stop being shiftable into obstructing position by said member when moving to cause a relative separation of said rollers, and means for rotating one of said rollers and for causing movements of said member, and means for selectively controlling the operation of said last named means.

10. In a printing device, printing mechanism, guiding means for conducting blanks successively through printing position, a stop movable into and out of a position in which it obstructs travel of the blanks along said guiding means, rollers disposed on opposite faces of the blank of said guiding means, one of said rollers being spring pressed toward the other to engage and grip between them a blank in printing position, and a cam device for shifting said movable roller away from the other roller or releasing it for movement toward said other roller, said cam device being also operable upon said stop to cause movement of the latter into obstructed position when the movable roller is shifted away from the relatively stationary roller and to cause a movement of the stop out of obstructing position when the movable roller is released for movement toward the relatively fixed roller.

11. In a printing device, printing mechanism, a guide for conducting blanks to be printed upon successively through printing position, rollers disposed on opposite faces of the plane of said guide, one of said rollers being spring pressed toward the other, so as to grip an interposed blank and propel it along said guide when one of said rollers is rotated, means including a cam arm for forcing the spring pressed roller away from the relatively fixed roller and holding it away from the latter, and an arm having a stop portion shiftable to present said stop portion in a position to obstruct travel of the blanks along the guide or to permit such movement, said arm and cam member having cooperating portions whereby when said cam member forces the movable roller away from the relatively fixed roller said arm will be shifted in a manner to present a stop portion in blank obstructing position, said arm being biased for movement into non-obstructing position.

12. In a printing device having printing mechanism, a guide for conducting blanks to be printed upon successively through printing position, rollers disposed on opposite faces of the plane of said guide, one of said rollers being spring pressed toward the other, so as to grip an interposed blank and propel it along said guide when one of said rollers is rotated, means including a cam arm for forcing the spring pressed roller away from the relatively fixed roller and holding it away from the latter, and an arm having a stop portion shiftable to present said stop portion in a position to obstruct travel of the blanks along the guide or to permit such movement, said arm and cam member having cooperating portions whereby when said cam member forces the movable roller away from the relatively fixed roller said arm will be shifted in a manner to present a stop portion in blank obstructing position, said cam member and arm having cooperating cam surfaces in contact with one another permitting retraction of the stop portion from obstructing position when said movable roller is released for movement toward the relatively fixed roller.

13. In a printing device, printing mechanism, a guide for conducting blanks to be printed successively through printing position, feeding means for feeding the blanks through said guide into printing position in succession, a stop shiftable into and out of a position to stop the blank in printing position, additional feeding means for removing said stop from said position and also the blanks from printing position, a constantly rotating drive member, and means selectively connectable to said continually moving member for operation thereby, and in turn operable in desired sequence upon said printing mechanism and both of said feeding means, for causing a feeding of the blanks into printing position, operation of the printing mechanism, and the removal of the printed blank from printing position.

14. In a printing device, printing mechanism, a guide for conducting blanks to be printed successively through printing position, feeding means for feeding the blanks through said guide into printing position in succession, additional feeding means for removing the blanks from printing position, a constantly rotating drive member, means for operating said printing mechanism and both of said feeding means to cause, in a desired sequence, the feeding of a blank into printing position, operation of the printing mechanism to print thereon, and the removal of the printed blank from printing position, means for coupling said operating means to said continually rotating member for operation thereby, and means for selectively adjusting said printing mechanism to change the information printed upon said blanks at each printing operation, said guide having an aperture exposing to view corresponding portions of each blank visible for reference in operating said adjusting means, while the blank is in printing position.

15. In a printing device, printing mechanism, a guide for conducting blanks to be printed successively through printing position, feeding means for feeding the blanks through said guide into printing position in succession, removable means for stopping the blanks in printing positions, additional feeding means for removing the blanks from printing position, a constantly rotating drive member, means for operating said printing mechanism, said removable means, and both of said feeding means to cause, in a desired sequence, the feeding of a blank into printing position, operation of the printing mechanism to print thereon, and the removal of the printed blank from printing position, means for coupling said operating means to said continually rotating member for operation thereby, and common controlling means for varying the printing mechanism to determine the selective information to be printed at each operation, and also causing a coupling of said operating means to said continually rotating means, said guide having a window exposing to view corresponding portions of said blanks while in printing position to guide an operator in the manipulation of said common controlling means.

16. In a printing device, printing mechanism, a guide for conducting blanks to be printed upon successively through printing position, feeding means disposed at opposite sides of the printing mechanism for feeding blanks to be printed upon successively into printing position, and then removing them from printing position, operating means connected to said printing mechanism and feeding means for causing operation of said printing means and feeding means in a desired sequence, whereby the blanks will be conducted successively into printing position printed upon and removed from printing position, a continually moving operating member, a clutch device for coupling the operating member and operating means, and a single controlling device for selectively adjusting said printing mechanism at each operation to determine the information to be printed upon the blanks at each operation, and mechanically operable upon said clutch for making said clutch device active to couple the operating member to said operating means.

17. In a printing device, printing mechanism, a guide for conducting blanks to be printed upon successively through printing position, feeding means disposed at opposite sides of the printing mechanism for feeding blanks to be printed upon successively into printing position, and then removing them from printing position, a stop for temporarily limiting movement of said blanks into printing positions, operating means connected to said printing mechanism and feeding means for causing operation of said printing means, stop and feeding means in a desired sequence, whereby the blanks will be conducted successively into printing position, printed upon and removed from printing position, a continually moving operating member, a clutch device for coupling the operating means and automatically operable into unclutched condition at the end of a definite cycle of operation of the coupled parts, and a single controlling device for selectively adjusting said printing mechanism at each operation to determine the information to be printed upon the blanks at each operation, and mechanically operable upon said clutch device to couple the operating member to said operating means.

18. In a printing device, printing mechanism, means for feeding blanks to be printed upon through printing position and operating the printing mechanism to print thereon automatically, a continually rotating wheel, a member rotatable about the axis of rotation of the wheel, a pawl carried by said member and rockable thereon into and out of coupled engagement with the wheel, a second member oscillatable about the axis of rotation of said wheel and also rotatable about the same axis, said second member having a cam connection to said pawl, whereby relative movement of said members will cause movements of the pawl into and out of engagement with said wheel, a spring device connected between said members for normally urging relative movement thereof in a manner to cause a coupling of the pawl and wheel, a connection between said first member and the operating means, a shiftable stop device with which the second member engages and by which it is releasably held against movement with the first member so as to cause relative movement of the members in a manner to disengage the pawl from the wheel and stop further rotation of said member, and also to tension the spring between said members, and means for shifting said abutment to release said second member for movement by said spring relative to the first member to cause movement of said pawl into coupled engagement with said wheel and thereby couple the continually rotating wheel to said operating means.

19. In a printing device, printing mechanism, means for feeding blanks to be printed upon through printing position and operating the printing mechanism to print thereon automatically, a continually rotating wheel, a member rotatable about the axis of rotation of the wheel, a pawl carried by said member and rockable thereon into and out of coupled engagement with the wheel, a second member oscillatable about the axis of rotation of said wheel and also rotatable about the same axis, said second member having a cam connection to said pawl, whereby relative movement of said members will cause movement of the pawl into and out of engagement with said wheel, a spring device connected between said members for normally urging relative movement thereof in a manner to cause a coupling of the pawl and wheel, a connection between said first member and the operating means, a shiftable stop device with which the second member engages and by which it is releasably held against movement with the first member so as to cause relative movement of the members in a manner to disengage the pawl from the wheel and stop further rotation of said member, and also to tension the spring between said members, means for shifting said abutment to release said second member for movement by said spring relative to the first member to cause movement of said pawl into coupled engagement with said wheel and thereby couple the continually rotating wheel to said operating means, and means operable concomitantly with the stopping of the second member by said shiftable abutment to prevent reverse movement of said first member when the pawl is disengaged from the ratchet wheel.

20. In a printing device, printing mechanism, operating means for feeding blanks to be printed upon successively through printing position and causing operation of the printing mechanism to print upon the same while in printing position, said means including a rotating controlling member, a continually rotating driving wheel, a pawl carried by said member and shiftable into and out of engagement with the wheel to couple or uncouple said driving wheel and said operating means, a second member mounted for rotation about the axis of rotation of said controlling member and having a cam connection to said pawl for shifting the latter into and out of engagement with the wheel upon relative movement of said members, a spring connected between said members to cause relative movement thereof in a direction to shift the pawl into coupled engagement with said wheel, a shiftable abutment against which the second member strikes at the completion of a cycle of operation to prevent further movement of said member in the same direction, the continued movement of the controlling member causing the relative movement of said members which tensions the spring connecting the members and disengages the pawl from the ratchet wheel, and means for shifting the abutment to release said second member and initiate a cycle of operation.

21. In a printing device, printing mechanism, means for feeding blanks into printing position relative to said mechanism, causing operation of the printing mechanism to print thereon, and removing them from printing position after being printed upon, a source of power including a continually rotating element, means for coupling said element to and uncoupling it from said first means to initiate and stop printing and feeding of the blanks and including a controlling member, and an abutment shiftable into the path of movement of said member for holding the same from further movement at the end of each printing operation, and out of its path to release it and initiate a new printing and feeding movement.

22. In a printing device, printing mechanism, means for feeding blanks into printing position relative to said mechanism, causing operation of the printing mechanism to print thereon, and removing them from printing position after being printed upon, a source of power including a continually rotating element, means for coupling said element to and uncoupling it from said first means to initiate and stop printing and feeding of the blanks and including a controlling member, a shaft having a kerf extending crosswise thereof and through which said member may pass when the shaft is shifted into one angular position and which prevents passage of the member when shifted into a different angular position, and means by which the shaft may be shifted between said positions.

23. In a printing device, printing mechanism, means for feeding blanks into printing position relative to said mechanism, causing operation of the printing mechanism to print thereon, and removing them from printing position after being printed upon, a source of power including a continually rotating element, means for coupling said element to and uncoupling it from said first means to initiate and stop printing and feeding of the blanks and including a controlling member, a shaft having a kerf extending crosswise thereof and through which said member may pass when the shaft is shifted into one angular position and which prevents passage of the member when shifted into a different angular position, a link connected eccentrically to said shaft, a lever connected to the free end of said link, and means for rocking said lever to oscillate the shaft and release said member for rotation.

24. In a printing device, printing mechanism adjustable to print a plurality of characters selectively, means for feeding blanks to be printed upon through printing position and causing an operation of the printing mechanism upon said blanks while the latter are in printing position, said means including a rotating controlling member, a shaft disposed in the path of travel of said member and normally preventing rotation thereof, said shaft having a kerf through which said member may pass when the shaft is rocked into one angular position, and means for rocking said shaft to release or stop said controlling member as desired.

25. In a printing device, printing mechanism adjustable to print a plurality of characters selectively, means for feeding blanks to be printed upon through printing position and causing an operation of the printing mechanism upon said blanks while the latter are in printing position, said means including a rotating controlling member, a shaft disposed in the path of travel of said member and normally preventing rotation thereof, said shaft having a kerf through which said member may pass when the shaft is rocked into angular position, an adjustable device for setting the printing mechanism to print selected characters, means including a controlling part shiftable with said setting device into all of the positions into which it may be moved, for rocking said shaft to release said member for operation, and means for returning the shaft automatically to stopping position when released.

26. In a printing device, a printing element carrying type characters which move through printing positions successively upon operation of said element, means for adjusting said element including an oscillating arm having a slot, means for feeding blanks through printing position and causing a printing thereon of the type characters in printing position, means for controlling said last named means including a shiftable abutment, and a lever for shifting said abutment, a member shiftable axially of the axis of oscillation of said arm and operable upon said lever to cause a shifting of said abutment, a pin carried by said member and slidable in the slot of said arm when shifted in one direction axially of its axis of oscillation, a stop member over which the pin moves during oscillation for preventing movement of the pin and member carrying it, sufficiently to shift the abument and initiate a printing and blank feeding operation, and having openings spaced apart along the path of movement of the pin when the latter moves with said arm into one of which openings the pin may move to permit shifting of the abutment when said printing element is set in one of its printing positions corresponding to the position of the arm.

27. In a printing device, printing mechanism, means for feeding blanks through printing position and printing selected characters thereon, means for stopping said means at the end of each cycle of operation during which each card is printed, said stopping means including a continually rotating coupling element serving as a source of power, a pair of members mounted for rotation about the axis of rotation of said element, a second coupling element carried by one of said members and shiftable into and out of coupling engagement with the other coupling element, said member carrying the coupling element being connected to said means for feeding the blanks and printing upon the same, said second coupling element and the other of said members having a cam connection with one another, whereby relative movement of said members will cause engagement or disengagement of said coupling elements, depending upon the direction of such relative movement, a spring connected between said members for normally causing such relative movement in a direction to cause a driving engagement of said coupling elements when said second member is released, and an abutment shiftable into and out of a position in which it is engaged by said member at the end of a cycle of operation for holding the second member until the relative movement of said members occurring by continued driving of the first member causes a disengagement of said coupling elements.

28. In a printing device, printing mechanism, means for feeding blanks through printing position and printing selected characters thereon, means for stopping said means at the end of each cycle of operation during which each card is printed, said stopping means including a continually rotating coupling element serving as a source of power, a pair of members mounted for rotation about the axis of rotation of said element, a second coupling element carried by one of said members and shiftable into and out of coupling engagement with the other coupling element, said member carrying the coupling element being connected to said means for feeding the blanks and printing upon the same, said second coupling element and the other of said member having a cam connection with one another, whereby relative movement of said members will cause engagement or disengagement of said coupling elements, depending upon the direction of such relative movement, a spring connected between said members for normally causing such relative movement in a direction to cause a driving engagement of said coupling elements when said second member is released, an abutment shiftable into and out of a position in which it is engaged by said second member at the end of a cycle of operation for holding the second member until the relative movement of said members occurring by continued driving of the first member causes a disengagement of said coupling elements, and means for preventing reverse movement of said first member upon disengagement of said coupling elements.

29. In a printing device, printing mechanism, means for feeding blanks through printing position and printing selected characters thereon, means for stopping said means at the end of each cycle of operation during which each card is printed, said stopping means including a continually rotating coupling element serving as a source of power, a pair of members mounted for rotation about the axis of rotation of said element, a second coupling element carried by one of said members and shiftable into and out of coupling engagement with the other coupling element, said member carrying the coupling element being connected to said means for feeding the blanks and printing upon the same, said second coupling element and the other of said members having a cam connection with one another, whereby relative movement of said members will cause engagement or disengagement of said coupling elements, depending upon the direction of such relative movement, a spring connected between said members for normally causing such relative movement in a direction to cause a driving engagement of said coupling elements when said second member is released, an abutment shiftable into and out of a position in which it is engaged by said second member at the end of a cycle of operation for holding the second member until the relative movement of said members occurring by continued driving of the first member causes a disengagement of said coupling elements, a check element movable with said first member, and a pawl cooperating with said check element when the first member is released by the disengagement of said coupling elements for preventing reverse movement of said first member.

30. In a printing device, printing means, means for feeding blanks successively through printing positions with respect to said means, a source of power, including a continually rotating coupling element, means for operating said printing and feeding means including a member connected thereto and rotatable about the axis of rotation of said coupling element, a pawl carried by said member and oscillatable into and out of engagement with said coupling element, a second member freely oscillatable about the axis of rotation of said coupling element, a pin carried by said pawl, said second member having a cam slot receiving said pin and terminating at different points therein at different radial distances from said axis of oscillation, whereby upon oscillation of said second member relatively to said first member said pawl will be shifted into and out of coupling engagement with said coupling element, a spring connected between said members for yieldingly urging said second member in a forward direction to shift the pawl into engagement with said coupling element, and an abutment shiftable into and out of a position in which it engages and holds said second member against further movement with said first member, and by the relative movement between the members thus caused rocking said pawl out of engagement with said coupling element.

31. In a printing device, printing means, means for feeding blanks successively through printing positions with respect to said means, a source of power, including a continually rotating coupling element, means for operating said printing and feeding means including a member connected thereto and rotatable about the axis of rotation of said coupling element, a pawl carried by said member and oscillatable into and out of engagement with said coupling element, a second member freely oscillatable about the axis of rotation of said coupling element, a pin carried by said pawl, said second member having a cam slot receiving said pin and terminating at different points therein at different radial distances from said axis of oscillation, whereby upon oscillation of said second member relatively to said first member, said pawl will be shifted into and out of coupling engagement with said coupling element, a spring connected between said members for yieldingly urging said second member in a forward direction to shift the pawl into engagement with said coupling element, an abutment shiftable into and out of a position in which it engages and holds said second member against further movement with said first member, and by the relative movement between the members thus caused rocking said pawl out of engagement with said coupling element, a check element moving with said first member and a lock pawl effective upon the check member at approximately the instant the first member is uncoupled from said coupling element, for preventing reverse movement of said first member, whereby the pawl will be held out of engagement with the coupling element until the second member is released by a shifting of the abutment.

32. In a printing device, printing means, means for feeding blanks successively through printing positions with respect to said means, a source of power, including a continually rotating coupling element, means for operating said printing and feeding means including a member connected thereto and rotatable about the axis of rotation of said coupling element, a pawl carried by said member and oscillatable into and out of engagement with said coupling element, a second member freely oscillatable about the axis of rotation of said coupling element, a pin carried by said pawl, said second member having a cam slot receiving said pin and terminating at different points therein at different radial distances from said axis of oscillation, whereby upon oscillation of said second member, relatively to said first member, said pawl will be shifted into and out of coupling engagement with said coupling element, a spring connected between said members for yieldingly urging said second member in a forward direction to shift the pawl into engagement with said coupling element, a shaft disposed in the path of said second member against which the second member engages at one point in its rotation to cause relative movement of said members and disengagement of said pawl and coupling element, and having a kerf through which the second member passes when the shaft is rocked into one angular position to present the kerf in alignment with said second member.

33. In a printing device, a casing, a printing element having printing characters spaced along the same and mounted in said casing for movement to carry said characters successively through printing positions, a platen cooperating with said printing element, means for causing relative movement of said platen and printing element, said casing having a window in a wall adjacent said printing element, a plate closing said window, and an inking roller resiliently mounted on said plate and yieldingly pressed against the printing surface of said printing element carrying the type characters for inking the same when said plate is in position to close said window.

34. In a printing device having printing mechanism, a guide for conducting blanks successively through printing position, feeding rollers arranged along the guide for propelling the blanks therealong into printing position, an enclosure for a stack of blanks, a plate closing the bottom of said enclosure and upon which the blanks rest, said enclosure having at the side towards the feeding roller and at the bottom of the enclosure a passage through which a single blank only may move to the feeding rollers, an abutment within the enclosure and flush with said plate and also located adjacent the entrance to said passage from the enclosure, said plate being mounted for movement toward and from said passage for sliding the lowermost blank resting thereon through said passage to said feed rollers at each movement toward the passage, and means for shifting said plate toward the passage sufficiently to move a blank into feeding engagement with said rollers.

35. In a printing device having printing mechanism, a guide for conducting blanks successively through printing position, feeding rollers arranged along the guide for propelling the blanks therealong into printing position, an enclosure for a stack of blanks, a plate closing the bottom of said enclosure and upon which the blanks rest, said enclosure having at the side towards the feeding roller and at the bottom of the enclosure a passage through which a single blank only may move to the feeding rollers, an abutment within the enclosure and flush with said plate and also located adjacent the entrance to said passage from the enclosure, said plate being mounted for movement toward and from said passage for sliding the lowermost blank resting thereon through said passage to said feed rollers at each movement toward the passage, and means for shifting said plate toward the passage sufficiently to move a blank into feeding engagement of said rollers, said plate having a lug engageable with the end of the blank farthest from the passage for propelling the blank into and through said passage.

36. In a printing device having printing mechanism including a type-carrying element and a platen, a guide for conducting blanks through printing position between the platen and printing element, feed rollers disposed adjacent the guide for propelling a blank along the guide into printing position, means for supporting a supply of blanks and feeding them separately and successively into said guide and into cooperation with said feed rollers, said last named means including a reciprocating support for the blanks, a bell crank, a link connecting one arm of the bell crank to said reciprocating support whereby said support will be reciprocated to feed a blank into said guide and to said feed rollers when said bell crank is rocked in one direction, a shaft, means including a cam carried by said shaft for rocking said bell crank, a driving connection between said shaft and feeding rollers whereby said feeding rollers will operate during operation of said shaft, said blanks when in printing position being beyond the influence of said feeding rollers, a second cam carried by said shaft, means operated by said second cam for causing relative movement of said printing element and platen, and means for causing a predetermined cycle of movement of said shaft sufficient to cause a printing upon a blank in printing position and the feeding of a new blank into printing position.

37. In a printing device having printing mechanism including a type-carrying element and a platen, a guide for conducting blanks through printing position between the platen and printing element, feed rollers disposed adjacent the guide for propelling a blank along the guide into printing position, means for supporting a supply of blanks and feeding them separately and successively into said guide and into cooperation with said feed rollers, said last named means including a reciprocating support for the blanks, a bell crank, a link connecting one arm of the bell crank to said reciprocating support whereby said support will be reciprocated to feed a blank into said guide and to said feed rollers when said bell crank is rocked in one direction, a shaft, means including a cam carried by said shaft for rocking said bell crank, a driving connection between said shaft and feeding rollers whereby said feeding rollers will operate during operation of said shaft, said blanks when in printing position being beyond the influence of said feeding rollers, a second cam carried by said shaft, means operated by said second cam for causing relative movement of said printing element and platen, means for causing a predetermined cycle of movement of said shaft sufficient to cause a printing upon a blank in printing position and the feeding of a new blank into printing position, and ejector mechanism operable upon blanks for removing them from printing position during the feeding of a new blank into printing position.

38. In a printing device having printing mechanism including a type-carrying element and a platen, a guide for conducting blanks through printing position between the platen and printing element, feed rollers disposed adjacent the guide for propelling a blank along the guide into printing position, means for supporting a supply of blanks and feeding them separately and successively into said guide and into cooperation with said feed rollers, said last named means including a reciprocating support for the blanks, a bell crank, a link connecting one arm of the bell crank to said reciprocating support whereby said support will be reciprocated to feed a blank into said guide and to feed rollers when said bell crank is rocked in one direction, a shaft, means including a cam carried by said shaft for rocking said bell crank, a driving connection between said shaft and feeding rollers whereby said feeding rollers will operate during operation of said shaft, said blanks when in printing position being beyond the influence of said feeding rollers, a second cam carried by said shaft, means operated by said second cam for causing relative movement of said printing element and platen, and means for causing a predetermined cycle of movement of said shaft sufficient to cause a printing upon a blank in printing position and the feeding of a new blank into printing position, said ejector mechanism including ejecting rollers.

39. In a printing machine, means for feeding the blanks to be printed upon in succession through printing position and printing thereon, means including a selectively adjustable operating member for selectively varying the information to be printed upon each blank in printing position and also controlling the printing operation thereon, an optical system mounted in a position to magnify corresponding parts of said blanks while the blanks are in printing position, and project the magnified images of such parts upon a plane in close proximity to said selective operating member.

40. In a printing machine, means for feeding blanks to be printed upon successively through printing position and printing thereon, means for selectively varying the information to be printed upon a blank in printing position at any time, including an operating element selectively adjustable into any of a plurality of positions and disposed at a distance from any blank in printing position, and an optical system arranged to project magnified images of corresponding portions of said blanks when in printing position upon a plane immediately in the rear of and slightly above said means, whereby images of said corresponding portions of the blanks in printing position will be projected upon a plane readily visible by the operator while varying said means in accordance with the projected images.

41. In a printing machine, means for feeding blanks to be printed upon successively through printing position and printing thereon, means for selectively varying the information printed upon each blank while in printing position and including an adjustable element whose position determines the character of the information to be printed upon any blank then in printing position, and an optical system for projecting images of corresponding parts of said blanks when in printing position upon a plane in close proximity to said adjustable element, whereby an operator may adjust said element in accordance with the images projected upon said plane without material shifting of the eyes at each operation.

42. In a printing machine, means for feeding blanks to be printed upon successively through printing position and printing thereon, means for selectively varying the information printed upon each blank while in printing position and including an adjustable element whose position determines the character of the information to be printed upon any blank then in printing position, an optical system for projecting images of corresponding parts of said blanks when in printing position upon a plane in close proximity to said adjustable element, whereby an operator may adjust said element in accordance with the images projected upon said plane without material shifting of the eyes at each operation, and illuminating means for illuminating said corresponding parts of the blanks when the latter are in printing position.

43. In a printing device, means for guiding blanks to be printed upon in succession in a prescribed path, selectively settable printing mechanism for printing selectively variable characters upon each blank while that blank is in one position in said path, normally inactive feeding means for moving one blank out of said position and concomitantly moving the next blank in succession into said position and stopping it in that position as one cycle of operation automatically, and means for setting said printing mechanism to determine the characters to be printed and operable to cause in sequence a printing operation upon the blank in printing position and then an actuation of said feeding means through one cycle.

44. In a printing device, means for guiding blanks to be printed upon in succession in a prescribed path and exposing to view a corresponding area of each blank while that blank is in one position in that path, selectively settable printing mechanism for printing selectively variable characters upon each blank while that blank is in said one position, normally inactive feeding means for moving one blank out of said position and concomitantly moving the next blank in succession into said position and stopping it in that position as one cycle of operation automatically, and manually controlled means for setting said printing mechanism in accordance with information exposed to view on a blank in said position before each operation and operable to cause in sequence a printing operation upon the blank in that position and then an actuation of said feeding means through one cycle.

JOSEPH H. MEYERS.
ELMER ROSENBERG.